United States Patent
Loaiza et al.

(10) Patent No.: US 10,719,446 B2
(45) Date of Patent: Jul. 21, 2020

(54) DIRECTLY MAPPED BUFFER CACHE ON NON-VOLATILE MEMORY

(71) Applicant: Oracle International Corporation, Redwood Shores, CA (US)

(72) Inventors: Juan R. Loaiza, Woodside, CA (US); J. William Lee, Belmont, CA (US); Wei-Ming Hu, Palo Alto, CA (US); Kothanda Umamageswaran, Sunnyvale, CA (US); Neil J. S. MacNaughton, Los Gatos, CA (US); Adam Y. Lee, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 15/693,273

(22) Filed: Aug. 31, 2017

(65) Prior Publication Data
US 2019/0065383 A1    Feb. 28, 2019

(51) Int. Cl.
*G06F 3/06*    (2006.01)
*G06F 11/20*    (2006.01)
(Continued)

(52) U.S. Cl.
CPC ...... *G06F 12/0873* (2013.01); *G06F 12/0866* (2013.01); *G06F 12/0868* (2013.01);
(Continued)

(58) Field of Classification Search
CPC ........... G06F 12/0873; G06F 17/30091; G06F 17/30132; G06F 2212/1016;
(Continued)

(56) References Cited

U.S. PATENT DOCUMENTS

| 4,425,615 A | 1/1984 | Swenson et al. |
| 4,881,166 A | 11/1989 | Thompson et al. |

(Continued)

FOREIGN PATENT DOCUMENTS

| CN | 102999519 A | 3/2013 |
| CN | 103177055 A | 6/2013 |

(Continued)

OTHER PUBLICATIONS

Baddepudi, U.S. Appl. No. 13/288,785, filed Nov. 3, 2011, Advisory Action, dated Dec. 29, 2017.
(Continued)

*Primary Examiner* — Charles Rones
*Assistant Examiner* — Tong B. Vo
(74) *Attorney, Agent, or Firm* — Hickman Palermo Becker Bingham LLP

(57) ABSTRACT

A method and apparatus for implementing a buffer cache for a persistent file system in non-volatile memory is provided. A set of data is maintained in one or more extents in non-volatile random-access memory (NVRAM) of a computing device. At least one buffer header is allocated in dynamic random-access memory (DRAM) of the computing device. In response to a read request by a first process executing on the computing device to access one or more first data blocks in a first extent of the one or more extents, the first process is granted direct read access of the first extent in NVRAM. A reference to the first extent in NVRAM is stored in a first buffer header. The first buffer header is associated with the first process. The first process uses the first buffer header to directly access the one or more first data blocks in NVRAM.

20 Claims, 8 Drawing Sheets

US 10,719,446 B2
Page 2

(51) Int. Cl.
*G06F 11/10* (2006.01)
*G06F 16/27* (2019.01)
*G06F 16/13* (2019.01)
*G06F 12/0873* (2016.01)
*G06F 16/172* (2019.01)
*G06F 12/0868* (2016.01)
*G06F 12/0866* (2016.01)

(52) U.S. Cl.
CPC ............ *G06F 16/13* (2019.01); *G06F 16/172* (2019.01); *G06F 2212/1016* (2013.01); *G06F 2212/222* (2013.01); *G06F 2212/463* (2013.01); *G06F 2212/465* (2013.01); *G06F 2212/608* (2013.01)

(58) Field of Classification Search
CPC ......... G06F 2212/222; G06F 2212/608; G06F 12/0866; G06F 12/0868; G06F 16/172; G06F 16/13; G06F 2212/463; G06F 2212/465
See application file for complete search history.

(56) References Cited

U.S. PATENT DOCUMENTS

| | | |
|---|---|---|
| 5,095,421 A | 3/1992 | Freund |
| 5,241,675 A | 8/1993 | Sheth et al. |
| 5,263,156 A | 11/1993 | Bowen et al. |
| 5,287,496 A | 2/1994 | Chen et al. |
| 5,333,265 A | 7/1994 | Orimo et al. |
| 5,333,316 A | 7/1994 | Champagne et al. |
| 5,355,477 A | 10/1994 | Strickland et al. |
| 5,369,757 A | 11/1994 | Spiro et al. |
| 5,388,196 A | 2/1995 | Pajak et al. |
| 5,423,037 A | 6/1995 | Hvasshovd |
| 5,454,102 A | 9/1995 | Tang et al. |
| 5,553,279 A | 9/1996 | Goldring |
| 5,555,404 A | 9/1996 | Torbjørnsen et al. |
| 5,559,991 A | 9/1996 | Kanfi |
| 5,566,315 A | 10/1996 | Milillo et al. |
| 5,574,906 A | 11/1996 | Morris |
| 5,581,753 A | 12/1996 | Terry et al. |
| 5,603,024 A | 2/1997 | Goldring |
| 5,613,113 A | 3/1997 | Goldring |
| 5,717,893 A | 2/1998 | Mattson |
| 5,774,643 A | 6/1998 | Lubbers |
| 5,806,076 A | 9/1998 | Ngai et al. |
| 5,870,758 A | 2/1999 | Bamford et al. |
| 5,870,761 A | 2/1999 | Demers et al. |
| 5,893,086 A | 4/1999 | Schmuck |
| 5,924,096 A | 7/1999 | Draper et al. |
| 5,943,689 A | 8/1999 | Tamer |
| 5,951,695 A | 9/1999 | Kolovson |
| 5,953,719 A | 9/1999 | Kleewein |
| 5,956,731 A | 9/1999 | Bamford et al. |
| 5,974,427 A | 10/1999 | Reiter |
| 5,983,277 A | 11/1999 | Heile et al. |
| 5,987,506 A | 11/1999 | Carter |
| 5,991,771 A | 11/1999 | Falls et al. |
| 6,014,669 A | 1/2000 | Slaughter et al. |
| 6,122,630 A | 9/2000 | Strickler et al. |
| 6,192,377 B1 | 2/2001 | Ganesh et al. |
| 6,243,838 B1 * | 6/2001 | Liu .......................... G06F 1/26 714/43 |
| 6,298,319 B1 | 10/2001 | Heile et al. |
| 6,353,835 B1 | 3/2002 | Lieuwen |
| 6,370,622 B1 | 4/2002 | Chiou et al. |
| 6,393,485 B1 | 5/2002 | Chao et al. |
| 6,457,105 B1 | 9/2002 | Spencer et al. |
| 6,516,327 B1 | 2/2003 | Zondervan et al. |
| 6,526,483 B1 | 2/2003 | Cho et al. |
| 6,574,717 B1 | 6/2003 | Ngai et al. |
| 6,611,898 B1 | 8/2003 | Slattery et al. |
| 6,691,139 B2 | 2/2004 | Ganesh et al. |
| 6,728,823 B1 | 4/2004 | Walker et al. |
| 6,839,751 B1 | 1/2005 | Dietz et al. |
| 6,922,754 B2 | 7/2005 | Liu et al. |
| 7,024,656 B1 | 4/2006 | Ahad |
| 7,031,994 B2 | 4/2006 | Lao et al. |
| 7,069,324 B1 | 6/2006 | Tiwana et al. |
| 7,076,508 B2 | 7/2006 | Brourbonnais et al. |
| 7,159,076 B2 | 1/2007 | Madter |
| 7,165,144 B2 | 1/2007 | Choubal et al. |
| 7,222,136 B1 | 5/2007 | Brown et al. |
| 7,287,034 B2 | 10/2007 | Wong et al. |
| 7,290,017 B1 | 10/2007 | Wang et al. |
| 7,290,090 B2 | 10/2007 | Madter |
| 7,334,064 B2 | 2/2008 | Davies |
| 7,415,723 B2 | 8/2008 | Pandya |
| 7,461,147 B1 | 12/2008 | Mowat et al. |
| 7,464,113 B1 | 12/2008 | Girkar et al. |
| 7,496,589 B1 | 2/2009 | Jain et al. |
| 7,506,103 B2 | 3/2009 | Madter |
| 7,548,898 B1 | 6/2009 | Tarenskeen et al. |
| 7,558,290 B1 | 7/2009 | Nucci |
| 7,570,451 B2 | 8/2009 | Bedillion et al. |
| 7,627,612 B2 | 12/2009 | Ahal et al. |
| 7,636,814 B1 | 12/2009 | Karr et al. |
| 7,644,084 B2 | 1/2010 | Rapp |
| 7,647,443 B1 * | 1/2010 | Chatterjee ............. G06F 3/0622 710/200 |
| 7,660,945 B1 | 2/2010 | Lee |
| 7,725,559 B2 | 5/2010 | Landis |
| 7,769,802 B2 | 8/2010 | Smith |
| 7,774,568 B2 | 8/2010 | Sudhakar |
| 7,836,262 B2 | 11/2010 | Gunna et al. |
| 7,885,953 B2 | 2/2011 | Chen |
| 7,904,562 B2 | 3/2011 | Takase et al. |
| 7,912,051 B1 | 3/2011 | Rowlands et al. |
| 7,921,686 B2 | 4/2011 | Bagepalli |
| 7,962,458 B2 | 6/2011 | Holenstein |
| 7,966,293 B1 | 6/2011 | Owara et al. |
| 8,010,497 B2 | 8/2011 | Verma et al. |
| 8,145,838 B1 | 3/2012 | Miller et al. |
| 8,204,892 B2 | 6/2012 | Balebail et al. |
| 8,244,984 B1 | 8/2012 | Glasco et al. |
| 8,266,472 B2 | 9/2012 | Bose |
| 8,327,080 B1 | 12/2012 | Der |
| 8,359,429 B1 | 1/2013 | Sharma et al. |
| 8,370,452 B2 | 2/2013 | Harvell et al. |
| 8,521,923 B2 | 8/2013 | Lee et al. |
| 8,566,297 B1 | 10/2013 | Dowers |
| 8,627,136 B2 | 1/2014 | Shankar |
| 8,683,139 B2 | 3/2014 | Gaither |
| 8,706,687 B2 | 4/2014 | Fineberg |
| 8,832,142 B2 | 9/2014 | Marwah et al. |
| 8,868,831 B2 | 10/2014 | Goyal et al. |
| 8,930,647 B1 * | 1/2015 | Smith ................. G06F 9/44557 711/154 |
| 8,977,801 B2 | 3/2015 | Grube |
| 9,003,159 B2 | 4/2015 | Deshkar |
| 9,075,710 B2 | 7/2015 | Talagala |
| 9,256,542 B1 | 2/2016 | Flower |
| 9,263,102 B2 | 2/2016 | Flynn |
| 9,306,947 B2 | 4/2016 | Kolbly |
| 9,361,232 B2 | 6/2016 | Umamageswaran et al. |
| 9,405,694 B2 | 8/2016 | Goyal et al. |
| 9,703,706 B2 | 7/2017 | Bagal et al. |
| 10,198,352 B2 | 2/2019 | Subrahmanyam et al. |
| 2002/0038384 A1 | 3/2002 | Khan |
| 2002/0059287 A1 | 5/2002 | Karasudani |
| 2002/0133508 A1 | 9/2002 | Larue et al. |
| 2002/0165724 A1 | 11/2002 | Bartus |
| 2003/0005223 A1 | 1/2003 | Coulson |
| 2003/0046298 A1 | 3/2003 | Weedon |
| 2003/0115324 A1 | 6/2003 | Blumenau |
| 2003/0217236 A1 | 11/2003 | Rowlands |
| 2004/0054860 A1 | 3/2004 | Dixit |
| 2004/0073754 A1 | 4/2004 | Cypher |
| 2004/0117441 A1 | 6/2004 | Liu et al. |
| 2004/0122910 A1 | 6/2004 | Douglass et al. |
| 2004/0148486 A1 | 7/2004 | Burton |
| 2004/0193574 A1 | 9/2004 | Suzuki |

(56) References Cited

U.S. PATENT DOCUMENTS

| | | | |
|---|---|---|---|
| 2004/0199552 A1 | 10/2004 | Ward et al. |
| 2004/0225719 A1 | 11/2004 | Kisley et al. |
| 2004/0225720 A1 | 11/2004 | Pinkerton |
| 2004/0225845 A1 | 11/2004 | Kruckemyer et al. |
| 2004/0230753 A1 | 11/2004 | Amiri |
| 2004/0254943 A1 | 12/2004 | Malcolm |
| 2005/0132017 A1 | 6/2005 | Biran et al. |
| 2005/0160224 A1 | 7/2005 | Cuomo et al. |
| 2005/0193160 A1 | 9/2005 | Bhatte et al. |
| 2005/0198062 A1 | 9/2005 | Shapiro |
| 2005/0210202 A1 | 9/2005 | Choubal et al. |
| 2006/0004691 A1 | 1/2006 | Sifry |
| 2006/0010130 A1 | 1/2006 | Leff et al. |
| 2006/0064441 A1 | 3/2006 | Yamamoto |
| 2006/0106890 A1 | 5/2006 | Paul et al. |
| 2006/0146814 A1 | 7/2006 | Shah et al. |
| 2006/0149786 A1 | 7/2006 | Nishiyama |
| 2006/0209444 A1 | 9/2006 | Song |
| 2006/0212481 A1 | 9/2006 | Stacey et al. |
| 2006/0218123 A1 | 9/2006 | Chowdhuri et al. |
| 2006/0271605 A1 | 11/2006 | Petruzzo |
| 2006/0271740 A1 | 11/2006 | Mark |
| 2007/0038689 A1 | 2/2007 | Shinkai |
| 2007/0006757 A1 | 3/2007 | Morris et al. |
| 2007/0067575 A1 | 3/2007 | Morris et al. |
| 2007/0078914 A1 | 4/2007 | Correl |
| 2007/0078940 A1 | 4/2007 | Fineberg et al. |
| 2007/0083505 A1 | 4/2007 | Ferrari et al. |
| 2007/0226277 A1 | 9/2007 | Holenstein et al. |
| 2007/0239791 A1 | 10/2007 | Cattell |
| 2007/0260819 A1 | 11/2007 | Gao et al. |
| 2008/0016283 A1 | 1/2008 | Madter |
| 2008/0046736 A1 | 2/2008 | Arimilli et al. |
| 2008/0098044 A1 | 4/2008 | Todd |
| 2008/0104329 A1 | 5/2008 | Gaither et al. |
| 2008/0155303 A1 | 6/2008 | Toeroe |
| 2008/0177803 A1 | 7/2008 | Fineberg et al. |
| 2008/0201234 A1 | 8/2008 | Castro |
| 2008/0209009 A1 | 8/2008 | Katwala et al. |
| 2008/0215580 A1 | 9/2008 | Altinel et al. |
| 2008/0219575 A1 | 9/2008 | Wittenstein |
| 2008/0222136 A1 | 9/2008 | Yates |
| 2008/0222159 A1 | 9/2008 | Aranha et al. |
| 2008/0235479 A1 | 9/2008 | Scales |
| 2008/0282055 A1* | 11/2008 | Yang ................ G06F 12/1027 |
| | | | 711/207 |
| 2008/0222111 A1 | 12/2008 | Hoang et al. |
| 2009/0138944 A1 | 5/2009 | Rajasekaran |
| 2009/0164536 A1 | 6/2009 | Nasre et al. |
| 2009/0171679 A1 | 7/2009 | Salgado et al. |
| 2009/0182960 A1 | 7/2009 | Crockett |
| 2009/0193189 A1 | 7/2009 | Carswell et al. |
| 2009/0235230 A1 | 9/2009 | Lucas |
| 2009/0240664 A1 | 9/2009 | Dinker et al. |
| 2009/0248871 A1 | 10/2009 | Takase et al. |
| 2009/0254521 A1 | 10/2009 | Raman |
| 2009/0276479 A1 | 11/2009 | Lucas |
| 2009/0287737 A1 | 11/2009 | Hammerly |
| 2009/0313311 A1 | 12/2009 | Hoffmann |
| 2010/0017556 A1 | 1/2010 | Chin et al. |
| 2010/0036843 A1 | 2/2010 | MacNaughton et al. |
| 2010/0042587 A1 | 2/2010 | Johnson |
| 2010/0070448 A1 | 3/2010 | Omoigui |
| 2010/0095059 A1 | 4/2010 | Kisley et al. |
| 2010/0122026 A1 | 5/2010 | Umamageswaran et al. |
| 2010/0145909 A1 | 6/2010 | Ngo |
| 2010/0158486 A1 | 6/2010 | Moon |
| 2010/0199042 A1 | 8/2010 | Bates |
| 2010/0205367 A1 | 8/2010 | Ehrlich |
| 2010/0274962 A1 | 10/2010 | Moesk |
| 2010/0278446 A1 | 11/2010 | Ganesh et al. |
| 2010/0306234 A1 | 12/2010 | Wang et al. |
| 2010/0332654 A1 | 12/2010 | Bose |
| 2011/0022801 A1 | 1/2011 | Flynn |
| 2011/0029569 A1 | 2/2011 | Ganesh et al. |
| 2011/0040861 A1 | 2/2011 | Van der Merwe |
| 2011/0041006 A1 | 2/2011 | Flower |
| 2011/0047330 A1 | 2/2011 | Potapov |
| 2011/0072217 A1 | 3/2011 | Hoang et al. |
| 2011/0087637 A1 | 4/2011 | Sundaram et al. |
| 2011/0153719 A1 | 6/2011 | Santoro |
| 2011/0173325 A1* | 7/2011 | Cherian ............... G06F 9/4416 |
| | | | 709/225 |
| 2011/0191522 A1 | 8/2011 | Condict |
| 2011/0191543 A1 | 8/2011 | Craske et al. |
| 2011/0238899 A1 | 9/2011 | Yano |
| 2011/0258376 A1 | 10/2011 | Young |
| 2011/0320804 A1 | 12/2011 | Chan et al. |
| 2012/0013758 A1 | 1/2012 | Frederiksen |
| 2012/0017037 A1 | 1/2012 | Riddle |
| 2012/0054225 A1 | 3/2012 | Marwah |
| 2012/0054533 A1 | 3/2012 | Shi et al. |
| 2012/0063533 A1 | 3/2012 | Fonseka |
| 2012/0158650 A1 | 6/2012 | Andre |
| 2012/0158729 A1 | 6/2012 | Mital |
| 2012/0166729 A1 | 6/2012 | Donley |
| 2012/0166886 A1 | 6/2012 | Shankar et al. |
| 2012/0209873 A1 | 8/2012 | He |
| 2012/0221788 A1 | 8/2012 | Raghunathan |
| 2012/0246202 A1 | 9/2012 | Surtani |
| 2012/0265743 A1 | 10/2012 | Ivanova |
| 2012/0290786 A1 | 11/2012 | Mesnier |
| 2012/0296883 A1 | 11/2012 | Ganesh |
| 2012/0323849 A1 | 12/2012 | Garin et al. |
| 2012/0323970 A1 | 12/2012 | Larson |
| 2013/0007180 A1 | 1/2013 | Talpey et al. |
| 2013/0019000 A1 | 1/2013 | Markus |
| 2013/0024433 A1 | 1/2013 | Amit |
| 2013/0066949 A1 | 3/2013 | Colrain |
| 2013/0132684 A1 | 5/2013 | Ostrovsky |
| 2013/0132705 A1 | 5/2013 | Ishii |
| 2013/0166534 A1 | 6/2013 | Yoon |
| 2013/0166553 A1 | 6/2013 | Yoon |
| 2013/0198312 A1 | 8/2013 | Tamir et al. |
| 2013/0212332 A1 | 8/2013 | Umamageswaran |
| 2013/0275391 A1 | 10/2013 | Batwara |
| 2013/0290462 A1* | 10/2013 | Lim .................... G06F 12/0866 |
| | | | 709/213 |
| 2013/0290598 A1 | 10/2013 | Fiske |
| 2013/0326152 A1 | 12/2013 | Loaiza et al. |
| 2013/0339572 A1* | 12/2013 | Fanning ............. G06F 12/1009 |
| | | | 711/102 |
| 2014/0012867 A1* | 1/2014 | Moss ...................... G06N 3/02 |
| | | | 707/756 |
| 2014/0089565 A1 | 3/2014 | Lee |
| 2014/0108421 A1 | 4/2014 | Isaacson et al. |
| 2014/0108751 A1 | 4/2014 | Brown |
| 2014/0149638 A1 | 5/2014 | Jain |
| 2014/0200166 A1 | 7/2014 | Van Rooyen |
| 2014/0281167 A1 | 9/2014 | Danilak |
| 2014/0281272 A1 | 9/2014 | Loaiza et al. |
| 2014/0325115 A1 | 10/2014 | Ramsundar |
| 2014/0337593 A1 | 11/2014 | Holbrook |
| 2014/0372486 A1 | 12/2014 | Bose |
| 2014/0372489 A1 | 12/2014 | Jaiswal |
| 2014/0372702 A1 | 12/2014 | Subramanyam |
| 2015/0006482 A1 | 1/2015 | Hardy |
| 2015/0006813 A1 | 1/2015 | Goyal et al. |
| 2015/0012690 A1 | 1/2015 | Bruce |
| 2015/0012735 A1 | 1/2015 | Tamir et al. |
| 2015/0019834 A1 | 1/2015 | Loh |
| 2015/0088811 A1 | 3/2015 | Hase et al. |
| 2015/0088822 A1 | 3/2015 | Raja |
| 2015/0088824 A1 | 3/2015 | Kamp et al. |
| 2015/0088830 A1 | 3/2015 | Kamp et al. |
| 2015/0088926 A1 | 3/2015 | Chavan |
| 2015/0089121 A1 | 3/2015 | Coudhury et al. |
| 2015/0089125 A1 | 3/2015 | Mukherjee et al. |
| 2015/0089134 A1 | 3/2015 | Mukherjee |
| 2015/0089138 A1 | 3/2015 | Tao et al. |
| 2015/0089140 A1 | 3/2015 | Sridharan |
| 2016/0026399 A1* | 1/2016 | Purkayastha ......... G06F 3/0619 |
| | | | 711/103 |
| 2016/0026579 A1 | 1/2016 | Samanta |

(56) References Cited

U.S. PATENT DOCUMENTS

| | | | |
|---|---|---|---|
| 2016/0132411 A1 | 5/2016 | Jolad et al. | |
| 2016/0132432 A1* | 5/2016 | Shen | G06F 12/0873 711/105 |
| 2016/0188414 A1 | 6/2016 | Jayakumar | |
| 2016/0306923 A1 | 10/2016 | Van Rooyen | |
| 2016/0335310 A1 | 11/2016 | Lahiri et al. | |
| 2017/0109317 A1 | 4/2017 | Hack et al. | |
| 2017/0177488 A1 | 6/2017 | Leung | |
| 2017/0300592 A1 | 10/2017 | Breslow | |
| 2018/0341596 A1 | 11/2018 | Teotia | |

FOREIGN PATENT DOCUMENTS

| | | |
|---|---|---|
| EP | 0 501 180 A | 9/1992 |
| GB | 2409 301 A | 6/2005 |
| WO | WO 93/18461 | 9/1993 |
| WO | WO2007/045839 A2 | 4/2007 |
| WO | WO2013/109640 A1 | 7/2013 |
| WO | WO 2015/094179 A1 | 6/2015 |

OTHER PUBLICATIONS

Frank, U.S. Appl. No. 13/956,096, filed Jul. 31, 2013, Supplemental Notice of Allowability, dated Jun. 13, 2018.

Muhkherjee et al., U.S. Appl. No. 15/257,754, filed Sep. 6, 2016, Office Action, dated Nov. 16, 2017.

Lahiri, U.S. Appl. No. 14/709,018, filed May 11, 2015, Office Action, dated Oct. 18, 2017.

Anonymous: "Transaction Handling", dated Jan. 1, 2002, https://docs.oracle.com/cd/A87860_01/doc/java.817/a83725/trans1.htm, 12 pages. Anonymous: "Chapter 6 Handling" Transactions with Enterprise Beans, dated Jan. 1, 2004, https://docs.oracle.com/cd/E19229-01/819-1644/detrans.html, 16 pages.

Ailamaki, Anastassia, et al, "Weaving Relations for Cache Performance," Proceedings of the 27$^{th}$ International Conference on Very Large Data Bases, Rome, Italy, Sep. 11-14, 2001, 14 pages.

Elmasri, et al., "Fundatmentals of Database Systems," Third Edition, Addison-Wesley Longman, Inc., Copyright © 2000, ISBN-0-8053-1755-4, pp. 32, 70, 118, 131-132, 134, 155-159, 170, 252-254, 558, 569-573, 591-592, and 789-790 (26 pgs).

Hilland et al., "RDMA Protocol Verbs Specification" Version 1.0), dated Apr. 25, 2003, 243 pages.

Culley P. et al., "An RDMA Protocol Specification" Internet Draft, dated Sep. 16, 2002, 58 pages.

Microsoft, "Database Instant File Initialization", SQL Server 2016, https://msdn.microsoft.com/en-us/library/ms175935.aspx, 3 pages.

Aronovich et al., "The Design of a Similarity Based Deduplication System", SYSTOR, 2009, 14 pages.

Forman et al., "Efficient Detection of Large-Scale Redundancy in Enterprise File Systems", dated Jan. 2009, 8 pages.

Bober, Paul M., et al., "On Mixing Queries and Transactions via Multiversion Locking", Computer Sciences Department, University of Wisconsin, 1992, pp. 535-545.

Mohan, C., et al., "Efficient and Flexible Methods for Transient Versioning of Records to Avoid Locking by Read-Only Transactions", XP000393583, IBM Almaden Research Center, publication date Feb. 6, 1992, pp. 124-133.

Harder Theo et al., "Database Caching—Towards a Cost Model for Populating Cache Groups," ADBIS 2004, LNCS 3255, A. Benczur, J. Demetrovics, 15 pages.

Oracle, Oracle Times Ten In-Memory Database API and SQI Reference Guide, Release 6.0, dated 2006, 37 pages.

Teschke et al., "Concurrent Warehouse Maintenance Without Comprising Session Consistency", University of Erlangen-Nuremberg., Pub 1998, 10 pages.

Vassilakis et al., "Implementation of Transaction and Concurrency Control Support in a Temporal DBMS", Department of Information Systems, University of Athens, vol. 23 No. 5. Pub 1998, 16 pages.

Oracle®, "TimesTen to TimesTen Replication Guide" Release 7.0, B31684-03, Sep. 2007. http://download.oracle.com/otn_hosted_doc/timesten/703/TimesTen-Documentation/replication.pdf.

Oracle®, "TimesTen to TimesTen In-Memory Database Introduction" Release 7.0, B31687-03, Sep. 2007. http://download.oracle.com/otn_hosted_doc/timesten/703/TimesTen-Documentation/intro.pdf.

Oracle® Clusterware, Administration and Deployment Guide, 11g Release 1 (11.1), B28255-06, Oct. 2008. http://download.oracle.com/docs/cd/B28359_01/rac.111/b28255.pdf.

The Times Ten Team, Mid-Tier Caching: The Times Ten Approach, Jun. 2002. ACM SIGMOD, 6 pages.

Bornhovd et al., "Adaptive Database Caching with DBCache", IEEE 2004, pp. 11-18.

The TimesTen Team, "High Performance and Scalability through Application-Tier, In-Memory Management", Proceedings of 26$^{th}$ International Conference on Very Large Databases, Cairo, Egypt, 2000, pp. 677-680.

Feng et al., "Accelerating Relational Databases by Leveraging Remote Memory and RDMA", Proceedings of the 2016 International Conference on Management of Data, SIGMOD, Jan. 1, 2016, pp. 355-370.

Tao, U.S. Appl. No. 15/720,972, filed Sep. 29, 2017, Office Action, dated Sep. 13, 2018.

Lahiri, U.S. Appl. No. 14/097,575, filed Dec. 5, 2013, Notice of Allowance, dated Nov. 9, 2018.

Muhkherjee, U.S. Appl. No. 15/257,754, filed Sep. 6, 2016, Corrected Notice of Allowance, dated Aug. 28, 2018.

Tao, U.S. Appl. No. 15/720,972, filed Sep. 29, 2017, Final Office Action, dated Jan. 24, 2019.

Rest, U.S. Appl. No. 15/409,091, filed Jan. 18, 2017, Notice of Allowance, dated May 14, 2019.

Lahiri, U.S. Appl. No. 14/709,018, filed May 11, 2015, Office Action, dated Apr. 22, 2019.

Lahiri, U.S. Appl. No. 14/709,018, filed May 11, 2015, Interview Summary, dated Jul. 3, 2019.

Shi, U.S. Appl. No. 15/720,949, filed Sep. 29, 2017, Office Action, dated Oct. 4, 2019.

Choudhury, U.S. Appl. No. 15/720,959, filed Sep. 29, 2017, Office Action, dated Oct. 4, 2019.

Wikipedia, the free encyclopedia, "Cuckoo Hasing", https://en.wikipedia.org/wiki/Cuckoo_hashing, last viewed on Jul. 31, 2017, 7 pages.

Wang et al., "C-Hint: An Effective and Reliable Cache Management for RDMAAccelerated Key-Value Stores", dated 2014, 2 pages.

Tyler Szepesi, et al. "Nessie: A Decoupled, Client-Driven, Key-Value Store using RDMA", Copyright 2015 the authors CS-2015-09, 13 pages. Szepesi, Tyler, et al. "Designing a low-latency cuckoo hash table for write-intensive workloads using RDMA." First International Workshop on Rack-scale Computing. 2014, 6 pages.

Pavlo, Andy, "15-721 Database Systems", Lecture #23 Non-Volatile Memory, dated Spring 2016, 70 pages.

Mitchell et al., "Using One-Sides RDMA Reads to Build a Fast, CPU-Efficient Key-Value Store" dated 2013, 12 pages.

Kalia et al., "Using RDMA Efficiently for Key-Value Services", ACM SIGVOMM, https://www.researchgate.net/publication/266659972_Using_RDMA_Eff, 5 pages, Aug. 2014.

Fan et al., "MemC3: Compact and Concurrent MemCache With Dumber Caching and Smarter Hashing", NSDI'13, dated Apr. 2013, 14 pages.

Dragojević, et al., "FaRM: Fast Remote Memory", https://www.usenix.org/conference/nsdi14/technical-sessions/dragojević, dated Apr. 2014, 15 pages.

Meiyyappan, U.S. Appl. No. 15/721,328, filed Sep. 29, 2017, Office Action, dated Nov. 29, 2019.

Baddepudi, U.S. Appl. No. 13/288,785, filed Nov. 3, 2011, Notice of Allowance, dated Nov. 15, 2019.

Vinogradov, Sergei, "Currency on Persistent Memory: Designing Concurrent Data Structures for Persistent Memory", SDC dated Sep. 2018, 22 pages.

Oleary, Kevin, "How to Detect Persistent Memory Programming Errors Using Intel® Inspector—Persistence Inspector", dated Feb. 15, 2018, 15 pages.

(56) References Cited

OTHER PUBLICATIONS

Marathe et al., "Persistent Memcached: Bringing Legacy Code tobByte-Addressable Persistent Memory", dated 2017, 7 pages.
Liu et al., "PMTest: A Fast and Flexible Testing Framework for Persistent Memory Programs", ASPLOS'19, Apr. 13-17, 2019, Providence, RI, USA, 15 pages.
Haria, Swapnil, "Architecture and Software Support for Persistent and Vast Memory", Date of final oral examination Jun. 10, 2019, 143 pages.
Arulra et al., "How to Build a Non-Volatile Memory Database Management System", SIGMOD'17, May 14-19, 2017, Chicago, IL, USA, 6 pages.

\* cited by examiner

DIRECTLY MAPPED BUFFER CACHE ON NON-VOLATILE MEMORY

FIELD

Embodiments described herein relate generally to computer systems, and more specifically, to techniques for implementing a buffer cache for a persistent file system in non-volatile memory.

BACKGROUND

Database systems are typically stored on persistent disk media. Disk I/O latency tends to be a performance bottleneck for on-disk database systems. As a result, on-disk database systems tend to be designed to minimize the effect of I/O latency. Such database systems do not address how to take advantage of non-volatile memory when the entire database fits in non-volatile memory.

A database may be implemented entirely in volatile memory, such as dynamic random-access memory (DRAM). However, because volatile memory is not persistent, it cannot guarantee durability of the data. Thus, such database systems are not suitable for running a database independently of persistent storage.

Byte-addressable non-volatile memory, such as non-volatile random-access memory (NVRAM). NVRAM is random-access memory that retains stored information, even when power is turned off. The latency for this new class of non-volatile memory is expected to be slightly slower than, but within the same order of magnitude of DRAM.

On a disk-based storage system, a buffer cache is typically used for disk buffering. In disk buffering, a buffer cache stored in DRAM is used to mediate data transfer. Accessing the buffer cache in DRAM is faster than reading from disk. Typically, when an I/O request is issued, the operating system searches the buffer cache for the requested data. If the data is in the buffer cache, the I/O request is satisfied without accessing the disk. If the data is not in the buffer cache, the data is copied from disk to the buffer cache on a block by block basis. The I/O operations are then performed on the data in the buffer cache rather than on the disk. Typically, a write operation is initially performed on copies of data blocks in the buffer cache. When the write operation is successfully performed on the data blocks in the buffer cache, the modified data blocks are copied to disk, thereby completing the write operation.

A database system that stores at least a portion of the database in DRAM (a "DRAM-enabled database system") cannot be directly adapted to store the same data in NVRAM due to fundamental differences in the behavior of DRAM and NVRAM. For example, because DRAM-enabled database systems cannot rely on volatile memory for persistence, these database systems maintain, in persistent storage, a copy of the database, or data usable to construct a persistent copy of the database. If a process in a DRAM-enabled database system makes changes to a database stored in DRAM, the volatile memory can be left in an unpredictable state if the process crashes before the changes are complete. However, because of the persistently stored data, the DRAM-enabled database system can recover from this crash without affecting the atomicity, consistency, isolation and durability (ACID) properties of the database.

If the DRAM and the persistent storage in a DRAM-enabled database system is directly replaced with NVRAM, this scenario would cause a failure. More specifically, if the database were stored completely in NVRAM, when a process that directly operates on the database crashes before changes to the database are complete, the database would be left in an unpredictable state.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the embodiments. It will be apparent, however, that the embodiments may be practiced without these specific details. In other instances, well-known structures and devices are shown in block diagram form in order to avoid unnecessarily obscuring embodiments.

General Overview

Techniques are described herein for implementing a persistent file system in non-volatile memory. Buffer headers stored in DRAM are used to implement access control to data that is persistently stored in NVRAM. The buffer headers store mappings that refer to one or more extents and/or data blocks. When a buffer header is associated with a process, the process is granted access to the referenced data.

Direct mappings reference extents and/or data blocks in NVRAM. When a buffer header stores a direct mapping that includes a reference to an extent in NVRAM, a process that is associated with the buffer header can access the referenced extent in NVRAM.

DRAM-copy mappings reference copies of the extents and/or data blocks in DRAM. When a buffer header stores a DRAM-copy mapping that includes a reference to a copy of data from the extent in DRAM, a process that is associated with the buffer header can access the copy of the extent, which is stored in DRAM. In some embodiments, the extent is copied to a data buffer in DRAM, and the DRAM-copy mapping includes a reference to the data buffer.

The techniques described herein may be used to implement a file system that is persistently stored in NVRAM, and/or a database system comprising a database that is persistently stored in NVRAM. The entire database and other persistent data related to the database may be stored in NVRAM. Furthermore, the techniques described herein may be used in distributed systems, such as to implement a distributed file system and/or a distributed database system.

In a database system, these techniques leverage database mechanisms to support the ACID properties of the database, while taking advantage of non-volatile memory to avoid I/O and to minimize the duplication of data in DRAM. When a database process reads data directly from one or more data blocks in NVRAM, the database system avoids the overhead associated with an I/O operation.

File System

Figure 1:
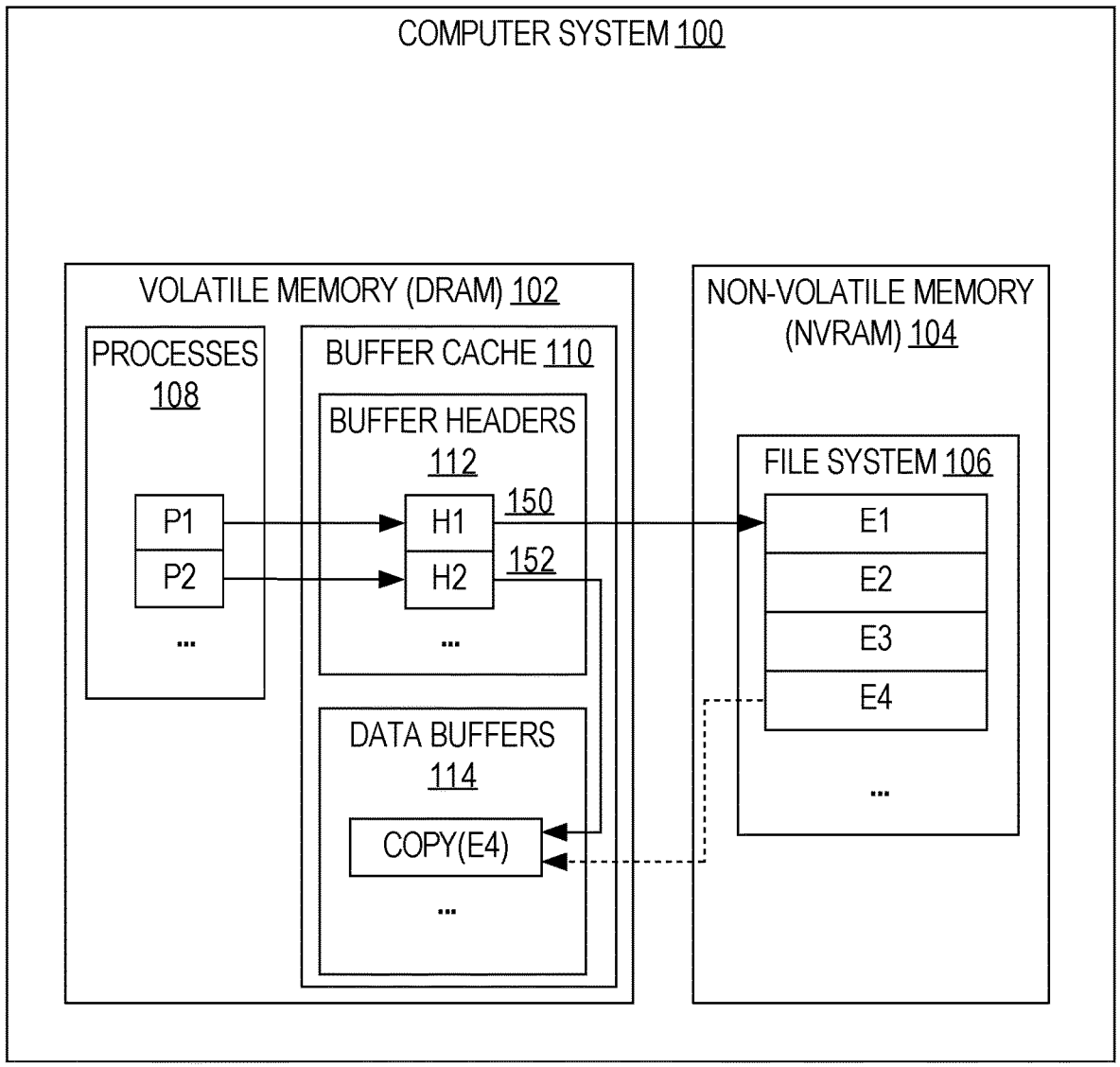
FIG. 1 is a block diagram depicting an example system architecture that may be used to implement one or more embodiments.

The techniques described herein may be used to implement a file system in non-volatile memory. FIG. 1 is a block diagram depicting an example system architecture that may be used to implement one or more embodiments. Computer system 100 implements a file system that is configured to store and provide access to one or more files in file system 106. For example, the file system implemented in computer system 100 may provide access to files in file system 106 to processes 108 that execute on the computer system 100.

As used herein, the term "file system" refers to a combination of software components and/or hardware components for storing and retrieving data in a data file. For example, the term may refer to the hierarchical structure of stored data, the hardware that stores the data, the software application that is used to carry out the scheme, the architecture of the software and/or the hardware, and any combination thereof. In some embodiments, the file system includes software that makes up a portion of an operating system for a computer system, such as computer system 100.

The computer system 100 includes DRAM 102, and NVRAM 104. The computer system 100 persistently stores one or more files in file system 106 in NVRAM 104. The NVRAM 104 includes a plurality of extents. Each file is stored on one or more extents in NVRAM 104. As used herein, the term DRAM refers to any form of volatile random access memory, and the term NVRAM refers to any form of non-volatile random access memory.

As used herein, the term "extent" refers to a set of contiguous data blocks in NVRAM. In some embodiments, data blocks in an extent are logically contiguous (i.e. occupy contiguous addresses within address space) but can be physically spread out on disk, such as due to RAID striping, file system implementations, or other factors. The computer system 100 may be set up such that each extent may include the same number of data blocks or a varying number of data blocks. A file may be stored on zero extents, one extent, or multiple extents. A file may be stored on multiple non-contiguous extents.

In some embodiments, the computer system 100 provides direct access and DRAM-copy access to the files in file system 106. As used herein, the term "direct access" refers to access to the data blocks in NVRAM 104. As used herein, the term "DRAM-copy access" refers to access to a copy, stored in DRAM 102, of data blocks in NVRAM 104. Thus, depending on the type of access granted (e.g. read, write, or other permissions), a process that is granted direct access can perform the type of access on the NVRAM directly, while a process that is granted DRAM-copy access cannot. Direct access and DRAM-copy access shall be described in greater detail hereafter.

Buffer Cache

In traditional disk-based database systems, a buffer cache is used to hold data blocks, or portions thereof, that are read from data files on disk. Instead of implementing a file system 106 comprising data stored on disk, computer system 100 implements a file system 106 comprising data stored in NVRAM 104.

Computer system 100 implements a buffer cache 110 that facilitates I/O operations for data stored in NVRAM 104. The buffer cache 110 includes buffer headers 112 and data buffers 114. The buffer headers 112 are used to store mappings that provide access to one or more extents and/or data blocks in NVRAM 104, or one or more copies thereof in DRAM 102. In some embodiments, when a DRAM copy, of one or more extents and/or data blocks in NVRAM 104, is generated, the DRAM copy is stored in data buffers 114.

The buffer headers are allocated in DRAM 102 of the computer system 100. The computer system 100 grants a process access to the file system 106 by storing metadata in a buffer header and associating a buffer header with the process. For example, buffer header H1 is associated with process P1 and buffer header H2 is associated with process P2, thereby granting access to a specified portion of the file system 106. In some embodiments, the buffer headers 112 are pre-allocated in DRAM 102, and access is granted by associating an existing, unused buffer header with the process to which access is granted.

In some embodiments, the computer system 100 grants access to the file system 106 by storing a mapping in the buffer header. When a process is granted direct access to an extent in NVRAM 104, a mapping to the extent in NVRAM 104 is stored in a buffer header that is associated with the process. When a process is granted DRAM-copy access to an extent, a DRAM-copy mapping to a copy of the extent in DRAM 102 is stored in a buffer header that is associated with the process. Direct mappings and DRAM-copy mappings shall be described in greater detail hereafter.

Direct Access and Direct Mapping

As used herein, the term "direct access" refers to access (e.g. read, write, or other types of access) to one or more data blocks in an extent in NVRAM 104 that stores the corresponding data. Direct access of one or more extents in NVRAM 104, one or more data blocks in NVRAM, or a portion thereof, may be granted to one or more processes 108 executing in DRAM 102.

Access of the file system 106 stored in NVRAM 104, including direct access, may be managed by an operating system of the computer system 100, a file system application executing on the computer system 100, other software executing on the computer system 100, one or more hardware components of the computer system 100 interacting with such software and/or any combination thereof. When the computer system 100 grants direct access to the file system 106, the mechanism to grant direct access may be implemented in software and/or hardware, which may include an operating system, a file system, other software, and/or hardware operating in the computer system 100.

To grant a particular process direct access to data in the file system 106 stored in NVRAM 104, the computer system 100 stores a direct mapping 150 in a particular buffer header of the buffer cache 110, and the particular buffer header is associated with the particular process. The direct mapping 150 includes a reference to the portion of NVRAM 104 to be accessed, such as one or more extents, one or more data blocks, or a portion thereof. For example, the direct mapping 150 may be a pointer into persistent memory (e.g. NVRAM 104). The direct mapping 150 may be a reference to a particular block within an extent. For example, the direct mapping 150 may include a reference to the extent with an offset. In some embodiments, the direct mapping 150 includes a memory address in NVRAM 104 and/or additional information, such as authentication information, permissions, other security information, an offset within the extent, a length, or any other information usable to locate data within the NVRAM 104 of the computer system 100.

DRAM-Copy Access and DRAM-Copy Mapping

As used herein, the term "DRAM-copy access" refers to access (e.g. read, write, or other types of access) to a copy of one or more data blocks in an extent in NVRAM 104, where the copy is stored in DRAM 102. Thus, although the corresponding data is persistently stored in NVRAM 104, the process is not granted access to the NVRAM 104 itself. DRAM-copy access of one or more extents in NVRAM 104, one or more data blocks in NVRAM, or a portion thereof, may be granted to one or more processes 108 executing in DRAM 102.

DRAM-copy access may be managed by an operating system of the computer system 100, a file system application executing on the computer system 100, or other software executing on the computer system 100. When the computer system 100 grants DRAM-copy access to the file system 106, the mechanism to grant direct access may be implemented in software and/or hardware, which may include an operating system, a file system, or other software operating on the computer system 100.

To grant a process DRAM-copy access to data in the file system 106 stored in NVRAM 104, the computer system 100 stores a DRAM-copy mapping 152 in a particular buffer header of the buffer cache 110, and the buffer header is associated with the process to which DRAM-copy access is granted. The DRAM-copy mapping 152 includes a reference to a portion of DRAM 102 that stores a copy of the data to be accessed. For example, the DRAM-copy mapping 152 may be a pointer into volatile memory (e.g. DRAM 102). In some embodiments, the DRAM-copy mapping 152 may include a memory address in DRAM 102 and/or additional information, such as authentication information, permissions, other security information, a memory offset, a length, or any other information usable to locate data within the DRAM 102 of the computer system 100.

In some embodiments, the DRAM-copy of the corresponding data may be maintained in the buffer cache 110. For example, one or more data buffers 114 may be used to store the DRAM-copy of the corresponding data. Although the DRAM-copy of the corresponding data is described in some embodiments as a copy of an extent, other units of data may be stored in one or more data buffers 114, such as a portion of an extent, one or more data blocks, a portion thereof, or another unit of data other than entire extents. In some embodiments, the data buffers 114 of the buffer cache 110 in DRAM 102 includes a pool of pre-allocated data buffers 114 that are sized based on the size of an extent in NVRAM 104.

Permissions

In some embodiments, the computer system 100 may control access by granting permissions. As used herein, the term "permission" refers to authorization that enables the grantee to access specific resources in a particular manner. Permissions may include a type of access, such as open, read, write, delete, modify, execute, or special permissions, including customized permissions. The computer system 100 may also control the type of access, such as direct access and DRAM-copy access. As used herein, the term "read" refers to access, permissions, and/or operations that cannot modify the corresponding data. As used herein, the term "write" refers to access, permissions, and/or operations that can modify the corresponding data.

In some embodiments, the computer system 100 selectively grants direct read access to data stored in NVRAM 104 and DRAM-copy write access to copies in DRAM 102 of the data stored in NVRAM 104. For example, when one or more processes request read access to data stored in NVRAM 104, the computer system 100 may grant direct read access to one or more of the processes, thereby allowing the processes to directly read data from the extent/s in NVRAM 104. When one or more processes request write access to data stored in NVRAM 104, the computer system 100 may grant DRAM-copy write access to one or more of the processes, thereby allowing the processes to access and modify a DRAM copy of the requested data in DRAM 102. Direct read access and DRAM-copy write access shall be described in greater detail hereinafter.

In some embodiments, the computer system 100 uses the direct mapping and DRAM-copy mapping mechanism described herein to implement other permissions and/or additional permissions to control access. The computer system 100 may also detect circumstances where permissions other than direct read access and DRAM-copy write access are appropriate. Examples of such circumstances shall be described in greater detail hereafter.

Direct Read Access

An example is provided of direct access implementation of data stored in the file system 106 in NVRAM 104. In response to a request from process P1 to access one or more blocks of extent E1, the computer system 100 populates buffer header H1 with a direct mapping 150. The direct mapping 150 includes a reference to the corresponding data, such as a reference to extent E1, a corresponding memory address in NVRAM 104, and/or other metadata that identifies the corresponding data in NVRAM 104. The computer system 100 then associates the buffer header H1 with process P1. Once process P1 is associated with buffer header H1, process P1 can directly access data stored in one or more blocks of extent E1 in NVRAM 104 using the direct mapping 150 stored in buffer header H1.

DRAM-Copy Write Access

An example is provided for DRAM-copy access implementation of data stored the file system 106 in NVRAM. Buffer header H2 includes a DRAM-copy mapping 152 usable to access a DRAM-copy of one or more data blocks of extent E4. The DRAM-copy of extent E4, COPY(E4), is stored in a data buffer 114 in the buffer cache 110. In response to a request from process P2 to access one or more blocks of extent E4, the computer system 100 determines whether the copy COPY(E4) is already maintained in a data buffer 114 of the buffer cache 110. If no copy of extent E4 is maintained in the buffer cache 110, then the computer system 100 populates a data buffer 114 with a copy of extent E4. Then, the computer system 100 populates a buffer header H2 with a DRAM-copy mapping 152. The DRAM-copy mapping 152 includes a reference to the copy of the corresponding data, such as a reference to the data buffer 114 containing COPY(E4). The computer system 100 then associates the buffer header H2 with process P2. Once process P2 is associated with buffer header H2, process P2 can access the copy COPY(E4) of extent E4 stored in data buffers 114 in DRAM 102 using the DRAM-copy mapping 152 stored in buffer header H1.

Changed data, such as data blocks and/or extents, are written back to NVRAM 104 using standard I/O procedures. In some embodiments, the I/O layer of the computer system 100 performs the write from the data buffer 114 to NVRAM 104. The I/O layer may be configured to avoid fractured blocks, torn blocks, and/or other errors.

Reference Count

In some embodiments, the computer system 100 maintains a reference count for one or more extents and/or data blocks for which direct access is currently granted. The reference count may be maintained in DRAM 102, such as in the buffer cache 110. Although the given examples involve reference counts maintained for extents, reference counts may be maintained for a different unit of data stored in NVRAM.

For a particular extent, the reference count indicates the number of references to the extent in NVRAM are currently active. That is, the reference count for a particular extent indicates the number of direct mappings to the extent in the buffer headers 112. The computer system 100 increments the reference count for the particular extent. In some embodiments, the reference count is incremented and decremented by the process to which direct access is granted. For example, process P1 may increment the reference count for extent E1 in the buffer cache 110 in response to being granted direct access to data in extent E1. When process P1 finishes accessing the data, the process decrements the reference count for extent E1.

Reference Count Cleanup

If a process crashes after obtaining direct access to an extent in NVRAM 104 but before releasing access and decrementing the reference count for the extent, another process may be configured to decrement reference counts on behalf of the dead process. In some embodiments, the reference count is decremented by a second process configured to perform other clean up functions after a first process crashes. For example, when a process obtains direct access to an extent via a particular buffer header, the process may store, in a shared memory area of DRAM 102, an indication that it is using the particular buffer header. If the process crashes, a cleanup process checks the shared memory area in DRAM 102 to determine whether the crashed process had direct access to any extents, and decrements the corresponding reference counts in DRAM 102.

The reference count is usable to prevent concurrency issues. In an embodiment, while some processes have been granted direct read access to a NVRAM block, no other process can write a DRAM copy data block buffer to the same NVRAM block. This is because otherwise the processes granted direct read access may read corrupt data. In one embodiment, a database may delay issuing such a write until the reference count for the NVRAM block becomes zero.

Database Implementation

Figure 2:
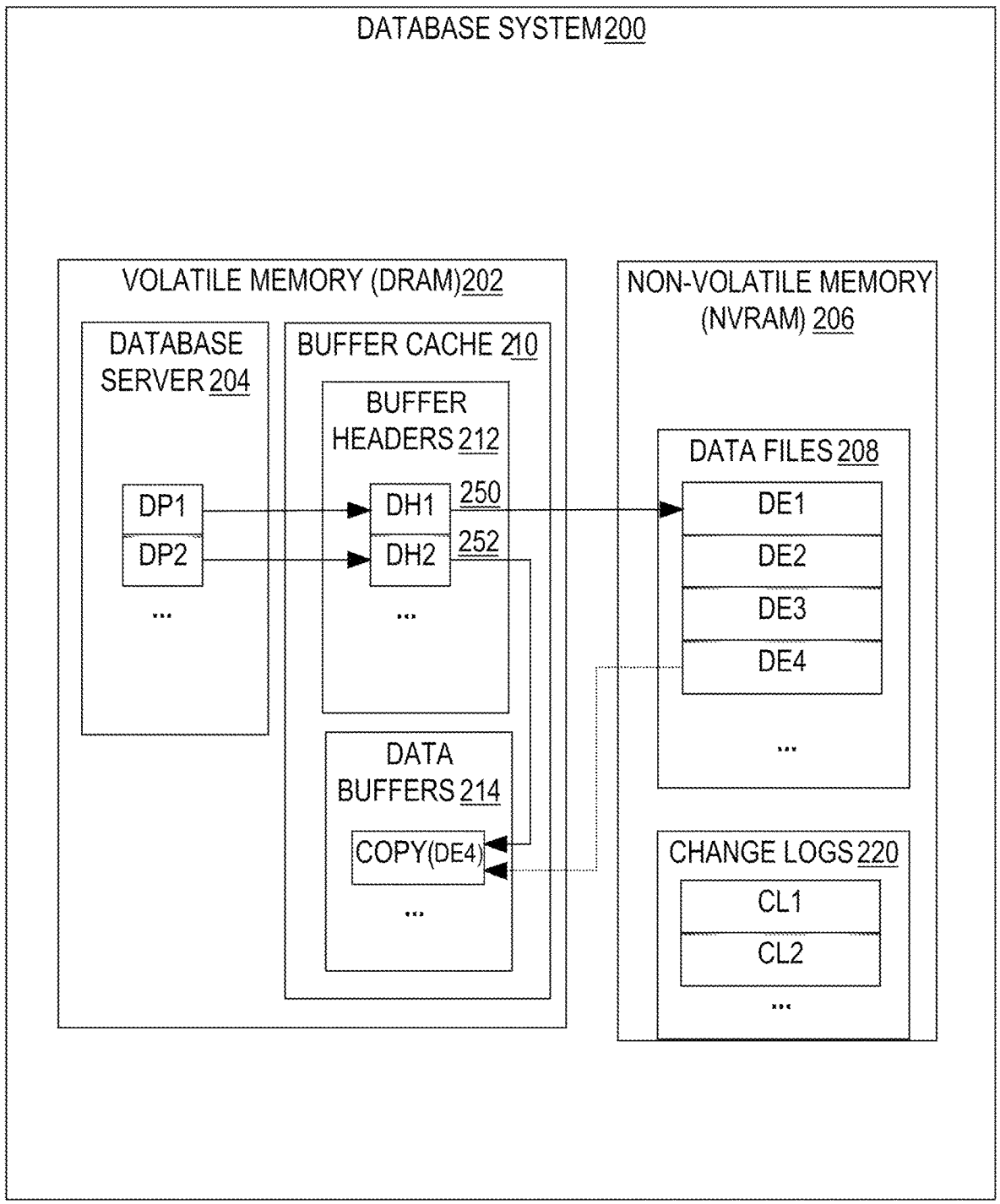
FIG. 2 is a block diagram depicting an example database system architecture which may be used to implement one or more embodiments.

The techniques described herein may be used to implement a database system for a data base stored entirely in non-volatile memory. FIG. 2 is a block diagram depicting an example database system architecture which may be used to implement one or more embodiments. Database system 200 is a computer system that includes DRAM 202 and NVRAM 206. The database system 200 stores one or more databases in NVRAM 206. A database comprises database data and metadata that defines database objects for the database, such as relational tables, table columns, views, and triggers. In some embodiments, the database is stored in NVRAM 206 as one or more data files 208 on extents in NVRAM 206. Each data file 208 may be stored on zero, one or multiple extents, which may or may not be contiguous.

Generally, a server, such as a database server, is a combination of integrated software components and an allocation of computational resources, such as memory and processes on a computer for executing the integrated software components. The combination of the software and computational resources are dedicated to providing a particular type of functionality to clients of the server.

A database server 204 runs on the database system 200. The database server 204 includes one or more processes that perform database operations, such as P1 and P2. The processes P1 and P2 are executed by the database system 200 and DRAM 202. The database server 204 manages client access of the database, including data stored in data files 208. For example, client applications may interact with the database server 204 by submitting database commands to the database server 204 that cause the database server 204 to perform database operations on data stored in a database, which is persistently stored in data files 208 in NVRAM.

Database Access Control

The database system 200 controls access to the data files 208 in NVRAM 206. Access control may be performed by the database server 204, an operating system of the database system 200, another file system application executing on the database system 200, other software executing on the database system 200, or any combination thereof. In some embodiments, the database system 200 may control access by granting permissions, such as open, read, write, delete, modify, execute, special permissions, and/or customized permissions. The database system 200 may also control the type of access, such as direct access and DRAM-copy access.

To grant a process direct access to data files 208 stored in NVRAM 206, the database system 200 stores a direct mapping 250 in a particular buffer header of the buffer headers 212 in buffer cache 210, and the particular buffer header is associated with the process to which direct access is granted. The direct mapping 250 includes a reference to the portion of NVRAM 206 to be accessed, such as one or more extents, one or more data blocks, or a portion thereof. For example, buffer header DH1 includes a direct mapping 250 associated with database server process DP1. In response to a request from database server process DP1 to access one or more blocks of extent DE1, the database system 200 populates buffer header DH1 with a direct mapping 250. The direct mapping 250 includes a reference to the corresponding data, such as a reference to extent DE1, a corresponding memory address in NVRAM 206, and/or other metadata that identifies the corresponding data in NVRAM 206. The database system 200 then associates the buffer header DH1 with process DP1. Once process DP1 is associated with buffer header DH1, process DP1 can directly access data stored in one or more blocks of extent DE1 in NVRAM 206 using the direct mapping 250.

To grant a process DRAM-copy access to data in the data files 208 stored in NVRAM 206, the database system 200 stores a DRAM-copy mapping 252 in a particular buffer header of the buffer cache 210, and the particular buffer header is associated with the process to which DRAM-copy access is granted. The DRAM-copy mapping 252 includes a reference to a portion of DRAM 202 that stores a copy of the data to be accessed. In some embodiments, the DRAM-copy of the corresponding data is maintained in the buffer cache 210, such as in one or more data buffers 214. For example, buffer header DH2 includes a DRAM-copy mapping 252 associated with database server process DP2. In response to a request from database server process DP2 to access one or more blocks of extent DE4, the database system 200 determines whether a copy COPY(DE4) of the one or more blocks of extent DE4 is already maintained in buffer cache 210. If no copy is maintained in the buffer cache 210, the database system 200 populates a data buffer 214 with a copy of at least the one or more blocks of extent DE4. Then, the database system 200 populates a buffer header DH2 with a DRAM-copy mapping 252. The DRAM-copy mapping 252 includes a reference to the copy of the corresponding data (e.g. the data buffer 214 containing COPY(DE4)). The database system 200 then associates the buffer header DH2 with the database server process DP2. Once database server process DP2 is associated with buffer header DH2, database server process DP2 can access the copy COPY(E4) of the one or more blocks of extent DE4 stored in DRAM 202 using the DRAM-copy mapping 252.

In some embodiments, the database system 200 selectively grants direct read access to the data files 208 stored in NVRAM 206 and DRAM-copy write access to copies in DRAM 202 of the data stored in NVRAM 206. When one or more database server processes request read access to the data files 208, the database system 200 may grant direct read access to one or more of the processes, thereby allowing the processes to directly read from the extent/s in NVRAM 206. When one or more database server processes request write access to the data files 208 stored in NVRAM 206, the database system 200 may grant DRAM-copy write access to one or more of the processes, thereby allowing the processes to access and modify a DRAM copy of the requested data in DRAM 202.

In some embodiments, the database system 200 uses the direct mapping mechanism and DRAM-copy mapping mechanism described herein to implement other permissions and/or additional permissions to control access. The database system 200 may also detect circumstances where permissions other than direct read access and DRAM-copy write access are appropriate.

Database Change Records

In some embodiments, the database system 200 persistently stores change records in NVRAM 206, such as in change logs 220. Change records can be used to undo changes made to the database. For example, if a change to a database needs to be undone, such as when a transaction is not committed, one or more change records may be processed to determine the necessary steps to undo the change described in the change record. Likewise, a change record may be used to reconstruct changes made to the database. For example, if a data file needs to be restored, a backup of the data file can be loaded, and one or more change records may be processed to redo changes made to the database since the backup. Change records are stored in NVRAM 206 to ensure their availability to the database server 204, since the database server 204 uses the change records to ensure the ACID properties in the database.

As changes are made to the database, the change records are generated and persistently stored in change logs 220 in NVRAM 206. For example, when a process of database server 204 makes a change to the database, a change record is stored in a change log 220. The change record may specify one or more data block(s) of the database being modified and respective change vectors that describe the changes made to the data block. In some embodiments, change records are generated as soon as a change is made to a DRAM copy, whether or not the changed data has been copied to NVRAM 206. The change records may include a logical timestamp. As used herein, the term "logical timestamp" includes any data usable to uniquely identify an order between any two logical timestamps. A logical timestamp may be based on an actual time, an order, or any other data usable to indicate an order.

In some embodiments, the database server 204 uses the change logs 220 to construct a "consistent read" copy of one or more data blocks. A consistent read copy of a data block reflects the state of the data block at a particular point, such as at a particular logical timestamp. For example, a consistent read copy of a data block at a specific timestamp is often used when responding to a query with the specific timestamp. In these cases, the data block is copied into DRAM 202, such as into a data buffer 214. The change records are then read from the change logs 220 and applied to the DRAM copy of the data block in the data buffer 214.

Distributed Volume Implementation

Figure 3:
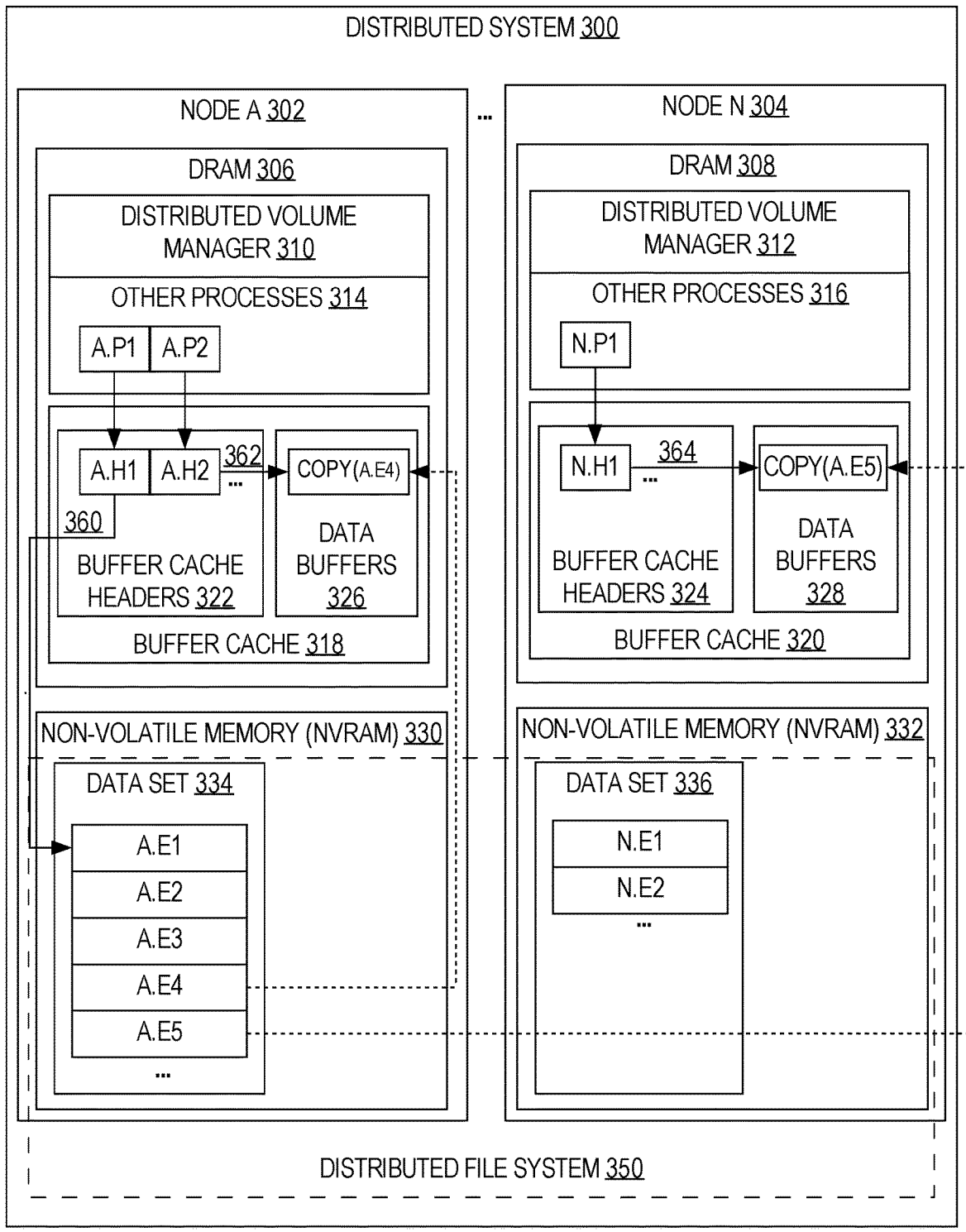
FIG. 3 is a block diagram depicting an example distributed system architecture that may be used to implement one or more embodiments.

The techniques described herein may be used to implement a distributed file system, and/or a distributed volume of data stored in non-volatile memory of a plurality of computing devices. FIG. 3 is a block diagram depicting an example distributed system architecture that may be used to implement one or more embodiments. Distributed system 300 is a cluster of a plurality of computing devices that include a plurality of nodes 302-304. Although two nodes are shown, the techniques described herein are scalable to include any number of nodes 302-304 in the distributed system 300.

Each node 302-304 of the distributed system 300 is a computing system that includes its own resources, including DRAM 306-308 and NVRAM 330-332. A distributed file system 350 storing a distributed volume of data is stored across the NVRAM 330-332 of the plurality of nodes 302-304. Each node 302-304 stores a portion of the distributed volume of data, of the distributed file system 350, as a data set 334-336 in its respective NVRAM 330-332.

Access of the distributed file system 350 may be managed by one or more operating systems of one or more of the nodes 302-304, one or more file system applications executing on one or more of the nodes 302-304, other software executing on one or more of the nodes 302-304, one or more hardware components of one or more of the nodes 302-304 interacting with such software, and/or any combination thereof. When the distributed system 300 grants access, such as direct access and/or DRAM copy access of data stored in the distributed file system 350, the mechanism to grant direct access may be implemented in software and/or hardware, which may include an operating system, a file system, other software and/or hardware operating in one or more of the nodes 302-304.

For each node 302-304, access control may be performed by the operating system of the node 302-304, another file system application executing on the node 302-304, other software executing on the node 302-304, or any combination thereof. In some embodiments, access control is performed by a distributed volume manager 310-312 that executes on the nodes 302-304. In some embodiments, a node 302-304 stores access control data for local processes, including access of data that is local and access that is remote.

Local and Remote Access Control

The distributed system 300 may selectively grant permissions, such as direct access and DRAM-copy access, to processes based on the type of access requested and based on whether the requesting process is requesting access to data stored in NVRAM 330-332 of the same node 302-304 or NVRAM 330-332 of another node 302-304. As used herein, the term "remote" refers to a node other than a current node, such as a current node on which a requesting process runs, and/or the resources of such a node. As used herein, the term "local" refers to resources the current node, such the node on which a requesting process runs, and/or the resources of such a node.

In some embodiments, the distributed system 300 is configured to grant direct read access to processes that request read access to data in the distributed file system 350 that is stored in one or more extents that are local to the requesting process. For example, process A.P1 of other processes 314 is granted direct read access to data stored in extent A.E1. In this case, the requested data is in data set 334, which is local to process A.P1. That is, process A.P1 executes on node A 302, and the extent that stores the requested data, A.E1, is an extent in the NVRAM 330 of node A 302, which is the same node where process A.P1 executes. Node A 302 grants direct read access to process A.P1 by associating a buffer header A.H1, of buffer cache headers 322 in buffer cache 318, with process A.P1 and storing a direct mapping 360 in the buffer header A.H1. The direct mapping 360 includes a reference to extent A.E1 in NVRAM 330. Process A.P1 directly accesses extent A.E1 in NVRAM 330 of node A 302 by using the direct mapping 360 stored in the buffer header A.H1 associated with it.

In some embodiments, the distributed system 300 is configured to grant DRAM-copy write access to processes that request write access to data in the distributed file system 350 that is stored in one or more extents that are local to the requesting process. For example, process A.P2 is granted DRAM-copy write access to data stored in extent A.E4. In this case, the requested data is in a local data set 334 with respect to process A.P2. However, even though extent A.E4 is local to process A.P2, process A.P2 is granted DRAM-copy access because the requested access is write access. Node A 302 grants DRAM-copy write access to process A.P2 by associating a buffer header A.H2 with process A.P2 and storing a DRAM-copy mapping 362 in the buffer header A.H2. The DRAM-copy mapping 362 includes a reference to a data buffer 326 stored in the local DRAM 306 that stores a COPY(A.E4) of the extent A.E4. Process A.P2 accesses a DRAM copy of extent A.E4 in DRAM 306 of node A 302 by using the DRAM-copy mapping 362 stored in the buffer header A.H2 associated with the process A.P2.

In some embodiments, the distributed system 300 is configured to grant DRAM-copy write access and DRAM-copy read access to processes that request access to data in the distributed file system 350 that is stored in one or more extents that are remote to the requesting process. For example, when a process N.P1 of other processes 316 executing on node N 304 requests access to data stored in a remote extent A.E5 in NVRAM 330 of node A, the distributed system 300 grants DRAM-copy access to process N.P1 by associating a buffer header N.H, of buffer cache headers 324 in buffer cache 320, with process N.P1 and storing a DRAM-copy mapping 364 in the buffer header N.H1. The DRAM-copy mapping 364 includes a reference to a data buffer 328 in the local DRAM 308 that stores a COPY (A.E5) of the extent A.E5 in NVRAM 330. The copy COPY(A.E5) may be generated by communicating with node A 302. Process N.P1 accesses the DRAM copy COPY (A.E5) in DRAM 308 of node N 304 by using the DRAM-copy mapping 364 stored in the buffer header N.H1 associated with the process N.P1.

In some embodiments, the distributed volume manager 310-312 may grant a process remote direct read access of NVRAM extents in a node that is remote to the process, such as via remote direct memory access (RDMA). RDMA allows direct access of remote memory without involving the operating system of either the local node or the remote node.

Any component of the distributed system 300 may make the determination of whether data requested by a particular process is local or remote with respect to the node on which the process executes. For example, when a process executing on a particular node requests particular data, a determination that the requested data is local or remote (i.e. resides in a local extent on the particular node or a remote extent of another remote) can be made by one or more components of the distributed system, such as the distributed volume manager 310-312, another component of the particular node, another component of another node, the particular process, another process, or any other component of the distributed system 300.

Distributed Volume Rebalancing

In some embodiments, the distributed volume manager 310-312 performs load rebalancing functions for the distributed file system 350. As used herein, the term "load balancing" refers to distributing and/or redistributing data between the nodes of a distributed system.

Distributed volume manager 310-312 may be configured to perform rebalancing by moving data stored in one or more extents from the NVRAM of one node to one or more extents the NVRAM of another node. Rebalancing may be performed when one or more nodes are added or removed from the distributed system 300, when one or more nodes fail, or to redistribute workload that accesses particular data on particular nodes, or in other situations where rebalancing of data is appropriate in a distributed file system.

In some embodiments, an extent is only moved if no processes currently have permission to directly access the extent. For example, when the distributed volume manager 310-312 determines that data stored in a particular extent of a local node should be moved to a remote node, the distributed volume manager 310-312 checks that no local processes still have permission to directly access the extent at the local node. In some embodiments, the distributed volume manager 310-312 waits until the reference count maintained for the extent at the local node is decremented to zero, indicating that no more local processes will potentially access the extent at the local node.

In some embodiments, when it is determined that data stored in a particular extent should be moved to a remote node, the distributed system 300 prevents additional direct access permissions from being granted for the particular extent. Instead, the access must be performed via other I/O techniques, such as via DRAM-copy access, even if the permission requested is read access to the particular extent from a local process. This prevents further incrementing of the reference count for the particular node.

Distributed Database Implementation

The techniques described herein may be used to implement a distributed database system for a database stored entirely in non-volatile memory of a plurality of computing devices. For example, the distributed system 300 may be a distributed database system, and the nodes 302-304 of the distributed system 300 may be database nodes 302-304. In one embodiment, the nodes 302-304 of the distributed system 300 are database instances, such as Oracle's shared-disk Real Application Clusters (RAC) instances.

The distributed file system 350 of the distributed system 300 can be used to implement shared storage to simulate a shared-disk database system. For example, the distributed volume manager 310-312 can simulate shared storage by forwarding database block access requests and/or by allowing direct remote block accesses via RDMA. The distributed volume manager 310-312 may also rebalance data files among nodes and may implement data file mirroring for the distributed database system. Mirroring may be used to increase the number of nodes that locally store a particular set of data in local NVRAM, and may thereby increase the availability of direct access to the particular set of data.

The data files of the distributed database system are stored across the NVRAM 330-332 of the nodes 302-304. In some embodiments, a database process executing on a particular node may be granted direct read access to read directly from the NVRAM of the particular node. The database process may also be granted DRAM-copy write access to access, at the particular node, a DRAM copy of data stored in the NVRAM of the particular node. The database process may also be granted DRAM-copy write access and/or DRAM copy read access to access a DRAM copy, at the particular node, of data stored in the NVRAM of a different node.

In some embodiments, change log files of the database are stored across the NVRAM 330-332 of the nodes 302-304 of the distributed system 300. Change log files may be shared between one or more database nodes. Alternatively and/or in addition, a database node may maintain one or more dedicated change log files corresponding to local changes.

Example Processes

Figure 4:
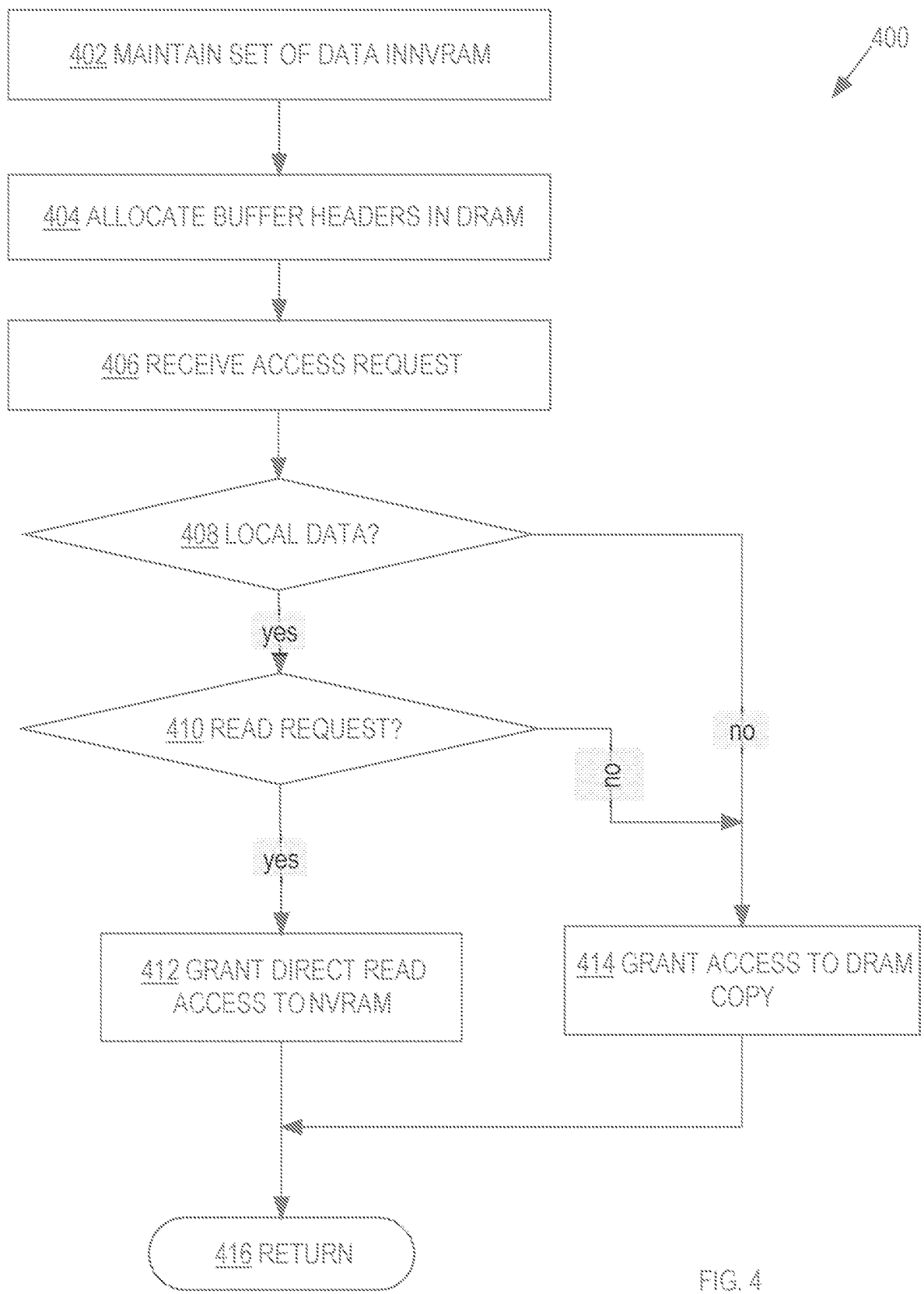
FIG. 4 is a flow diagram depicting a process for managing access to persistent data stored in NVRAM accordance with one or more embodiments.

FIG. 4 is a flow diagram depicting a process for managing access to persistent data stored in NVRAM accordance with one or more embodiments. Process 400 may be performed by one or more computing devices and/or processes thereof. For example, one or more blocks of process 400 may be performed by computer system 700. In some embodiments, one or more blocks of process 400 are performed by a computer system such as computer system 100, a database system such as database system 200, and/or a distributed system such as distributed system 300.

At block 402, a set of data is maintained in NVRAM of one or more computer systems. The set of data is stored persistently in NVRAM.

At block 404, one or more buffer headers are allocated in DRAM. In some embodiments, a pool of buffer headers are pre-allocated.

At block 406, an access request to access one or more extents is received from a requesting process. In some embodiments, process 400 is performed by a computing device on which the requesting process is executing.

At decision block 408, it is determined whether the one or more extents are local. If it is determined that the one or more extents are local, processing proceeds to block 410. If it is determined that the one or more extents not local, processing proceeds to block 414. When the process is performed in a single-computer system, then the one or more extents are always local with respect to the process.

At decision block 410, it is determined whether the request for local data is a read request. If it is determined that the request for local data is a read request, processing proceeds to block 412. If it is determined that the request for local data is not a read request, processing proceeds to block 414.

At block 412, direct read access to the one or more extents is granted to the process. For example, one or more buffer headers may be associated with the process and populated with one or more references to the one or more extents.

At block 414, DRAM-copy access to the one or more extents is granted to the process. For example, one or more buffer headers may be associated with the process and populated with one or more references to data buffers in DRAM that store a DRAM copy of the data stored in the one or more extents in NVRAM.

At block 416, process 400 returns and/or terminates. For example, processing may continue to processing another access request, passing control to a calling process, generating any appropriate record or notification, returning after a method or function invocation, or terminating. In some embodiments, when access to multiple extents is requested, the process is performed for each extent. Alternatively and/or in addition, multiple access requests are processed.

Figure 5:
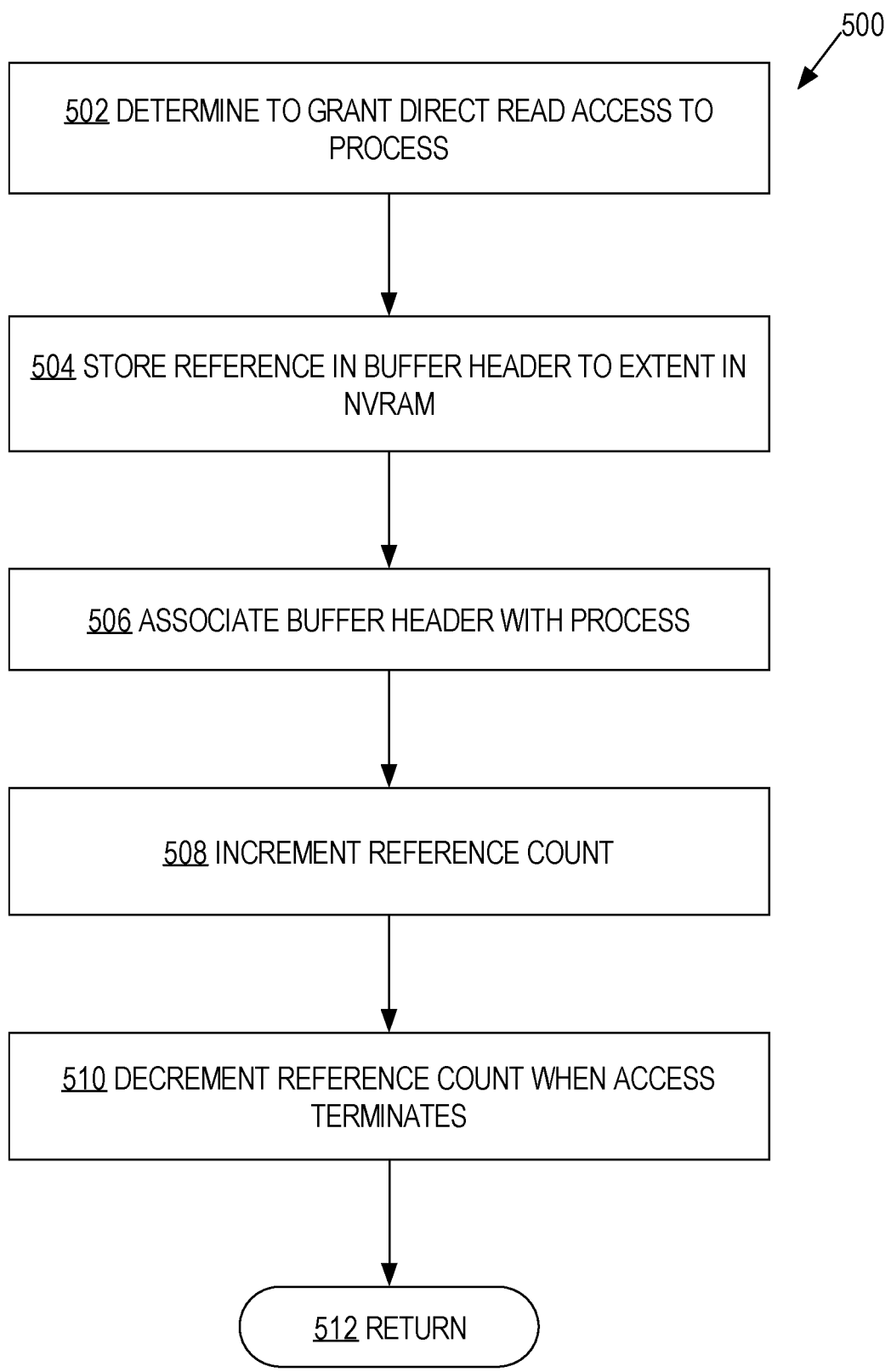
FIG. 5 is a flow diagram depicting a process for providing direct read access to persistent data stored in NVRAM in accordance with one or more embodiments.

FIG. 5 is a flow diagram depicting a process for providing direct read access to persistent data stored in NVRAM in accordance with one or more embodiments. Process 500 may be performed by one or more computing devices and/or processes thereof. For example, one or more blocks of process 500 may be performed by computer system 700. In some embodiments, one or more blocks of process 500 are performed by a computer system such as computer system 100, a database system such as database system 200, and/or a distributed system such as distributed system 300. One or more blocks of process 500 may be performed by an operating system, a database server, other file management software, and/or a volume manager, including distributed software.

At block 502, the system determines to grant a process direct read access to an extent. At block 504, the system stores a reference to the extent in a buffer header. In some embodiments, the system stores the reference in an unused buffer header from a pool of allocated buffer headers that are no longer associated with any process.

At block 506, the system associates the buffer header with the process. The process may now use the association to access the buffer header, read the reference, and locate the extent in NVRAM to directly read the extent in NVRAM.

At block 508, the system increments a reference count maintained for the extent. A non-zero reference count indicates that one or more processes currently have permissions to access the extent. In some embodiments, each process that receives permissions to access the extent increments the reference count for the extent.

At block 510, the system decrements a reference count maintained for the extent when access terminates. For example, when the process finishes accessing the extent, the process may decrement the reference count. In some embodiments, another process decrements the reference count when the first process crashes or otherwise fails.

At block 512, process 500 returns and/or terminates. For example, processing may continue to processing another access request, passing control to a calling process, generating any appropriate record or notification, returning after a method or function invocation, or terminating.

Figure 6:
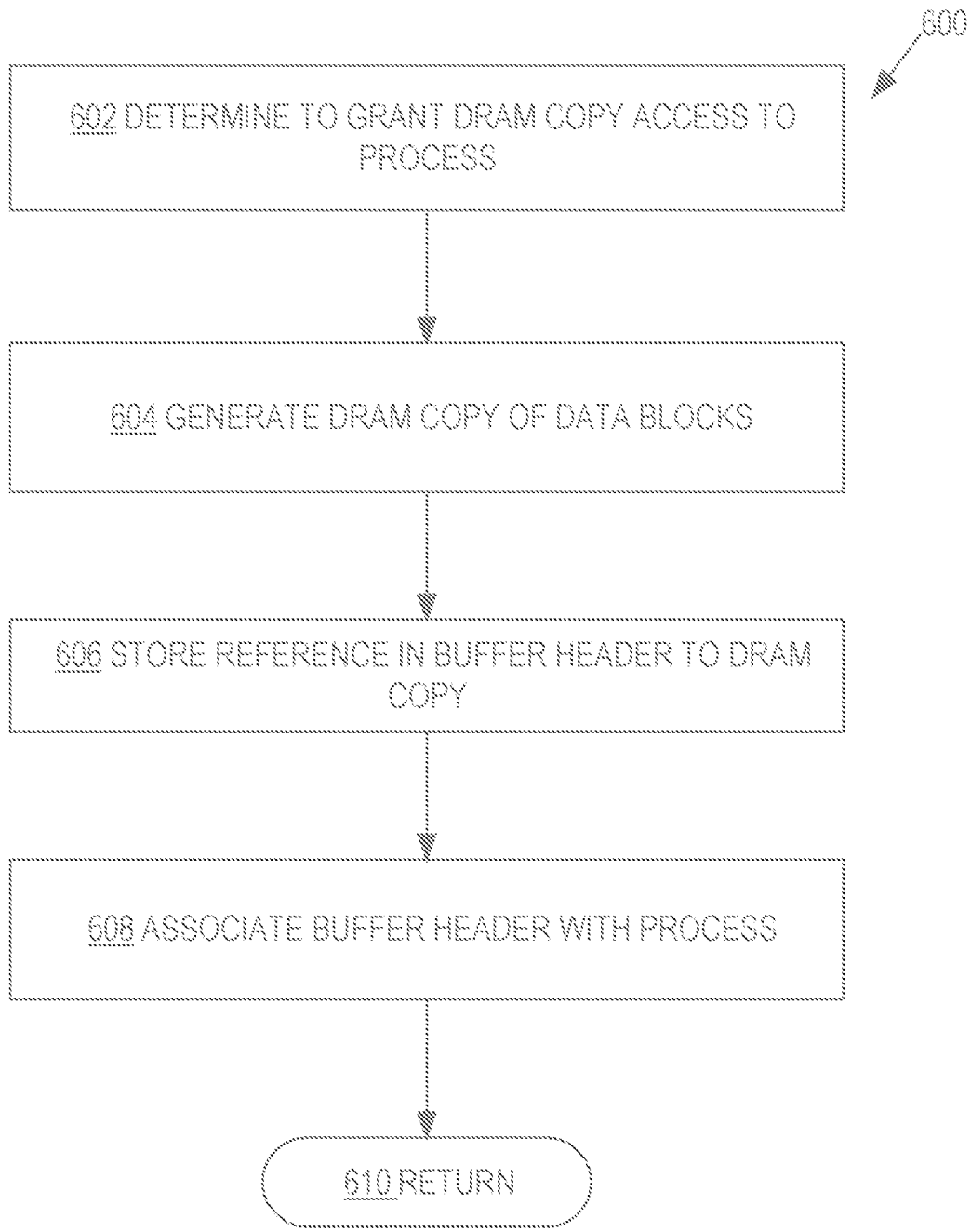
FIG. 6 is a flow diagram depicting a process for providing DRAM-copy access to persistent data stored in NVRAM in accordance with one or more embodiments.

FIG. 6 is a flow diagram depicting a process for providing DRAM-copy access to persistent data stored in NVRAM in accordance with one or more embodiments. Process 600 may be performed by one or more computing devices and/or processes thereof. For example, one or more blocks of process 600 may be performed by computer system 700. In some embodiments, one or more blocks of process 600 are performed by a computer system such as computer system 100, a database system such as database system 200, and/or a distributed system such as distributed system 300.

At block 602, a computer system determines that a process should be granted DRAM copy access to an extent. For example, the computer system may determine, in response to a request from the process, that DRAM copy access should be granted.

At block 604, the computer system generates a DRAM copy of one or more data blocks of the extent. For example, the computer system may copy the one or more data blocks from NVRAM to a data buffer in DRAM. When the extent resides on a remote node in remote NVRAM, the computer system retrieves the data blocks from the remote node.

At block 606, the computer system stores a reference to the DRAM copy in the buffer header. For example, the computer system may store a reference to the data buffer in DRAM.

At block 608, the computer system associates the buffer header with the process that requested access. The process may use the association to read the reference stored in the buffer header, and then use the reference to access the DRAM copy of the data.

At block 610, process 600 returns and/or terminates. For example, processing may continue to processing another access request, passing control to a calling process, generating any appropriate record or notification, returning after a method or function invocation, or terminating.

Example Database System

Since an embodiment of the present invention is implemented within the context of a database management system (DBMS), a description of a database management system is included herein. A DBMS manages a database. A DBMS may comprise one or more database servers. A database comprises database data and a database dictionary that are stored on a persistent memory mechanism, such as a set of hard disks. Database data may be stored in one or more data containers, each containing one or more records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, also referred to herein as object records, and the fields are referred to as attributes. Other database architectures may use other terminology.

Users interact with a database server of a DBMS by submitting to the database server commands that cause the database server to perform operations on data stored in a database. A user may be one or more applications running on a client that interact with a database server.

A database command may be in the form of a database statement that conforms to a syntax of a database language. One example language for expressing database commands is the Structured Query Language (SQL). SQL data definition language ("DDL") instructions are issued to a DBMS to define database structures such as tables, views, or complex data types. For instance, CREATE, ALTER, DROP, and RENAME, are common examples of DDL instructions found in some SQL implementations. SQL data manipulation language ("DML") instructions are issued to a DBMS to manage data stored within a database structure. For instance, SELECT, INSERT, UPDATE, and DELETE are common examples of DML instructions found in some SQL implementations. SQL/XML is a common extension of SQL used when manipulating XML data in an object-relational database.

Performing operations within a database server often entails invoking multiple layers software. A layer is set of software modules that perform a functionality that has been dedicated, to an extent, within a database server to the set of software modules. Executing an operation typically involves calling multiple layers of software, with one layer making a call to another layer, which during the execution of the first call, calls another layer. For example, to execute an SQL statement, an SQL layer is invoked. Typically, a client accesses a database server through an interface, such as an SQL interface to the SQL layer. The SQL layer analyzes and parses and executes the statement. During execution of the statement, the SQL layer calls modules of a lower layer to retrieve a particular row from a table and to update a particular in a table. A client, such as a replication client, typically accesses the database via a database command to the database server, such as in the form of a SQL statement.

Although the examples described above are based on Oracle's SQL, the techniques provided herein are not limited to Oracle's SQL, to any proprietary form of SQL, to any standardized version or form of SQL (ANSI standard), or to any particular form of database command or database language. Furthermore, for the purpose of simplifying the explanations contained herein, database commands or other forms of computer instructions may be described as performing an action, such as creating tables, modifying data, and setting session parameters. However, it should be understood that the database command itself performs no actions, but rather the DBMS, upon executing the database command, performs the corresponding actions. Typically, database commands are executed over a synchronous connection to the database.

Example Implementation System

According to some embodiments, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
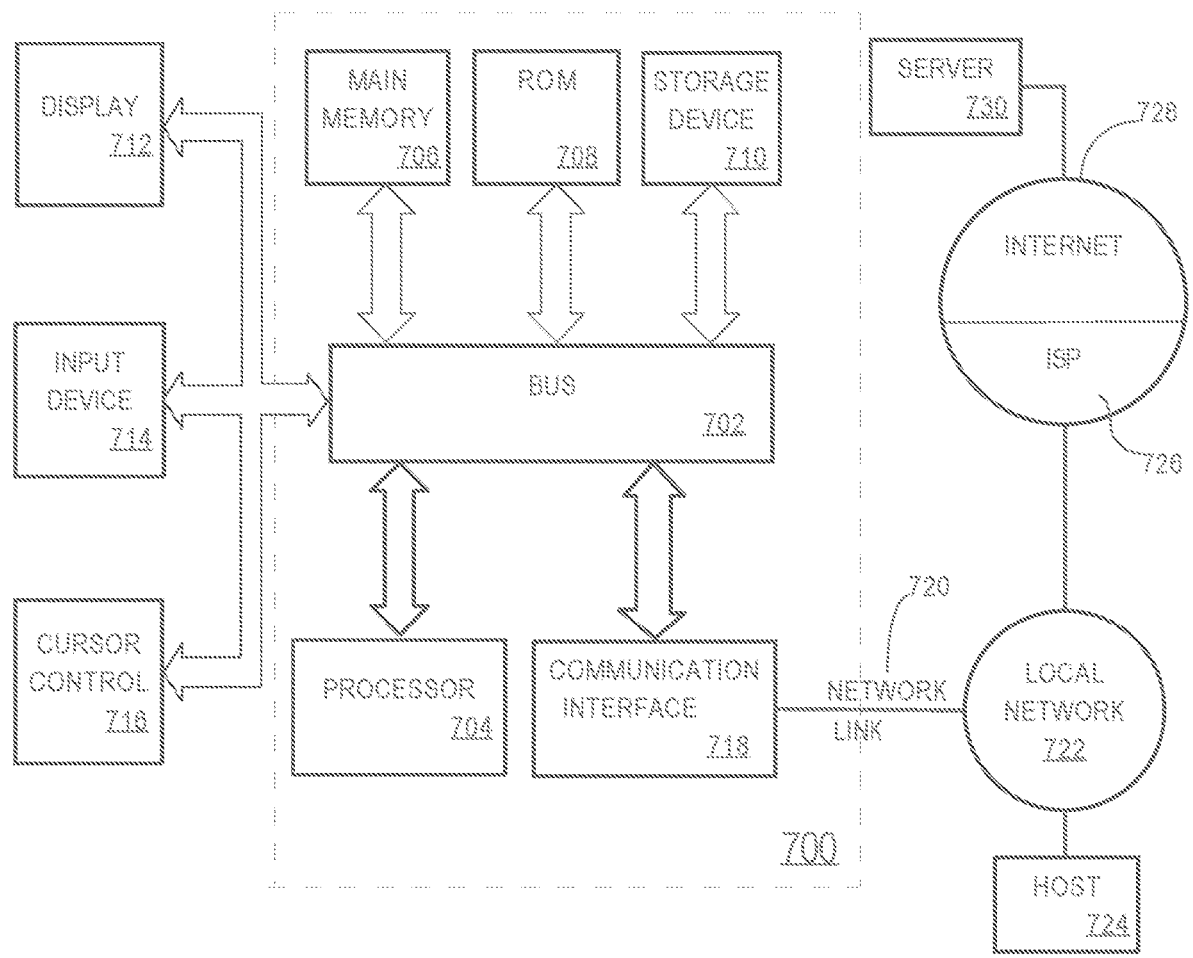
FIG. 7 illustrates a computer system upon which one or more embodiments may be implemented.

For example, FIG. 7 is a block diagram that depicts a computer system 700 upon which an embodiment may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to some embodiments, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. As used herein, "non-volatile" refers to a characteristic of a memory that retains data in the absence of any form of electrical power, including external or battery backup. Examples of non-volatile memory include, for example, e-prom memory, flash memory, optical disks, magnetic disks, or solid-state drives, such as storage device 710. Non-volatile memory does not include volatile memory for which power is retained by a battery backup in the absence of another external power source. For example, volatile memory coupled to a board with an embedded battery-backup is not non-volatile memory because without the power provided by a battery, the volatile memory does not retain data.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

Software Overview

Figure 8:
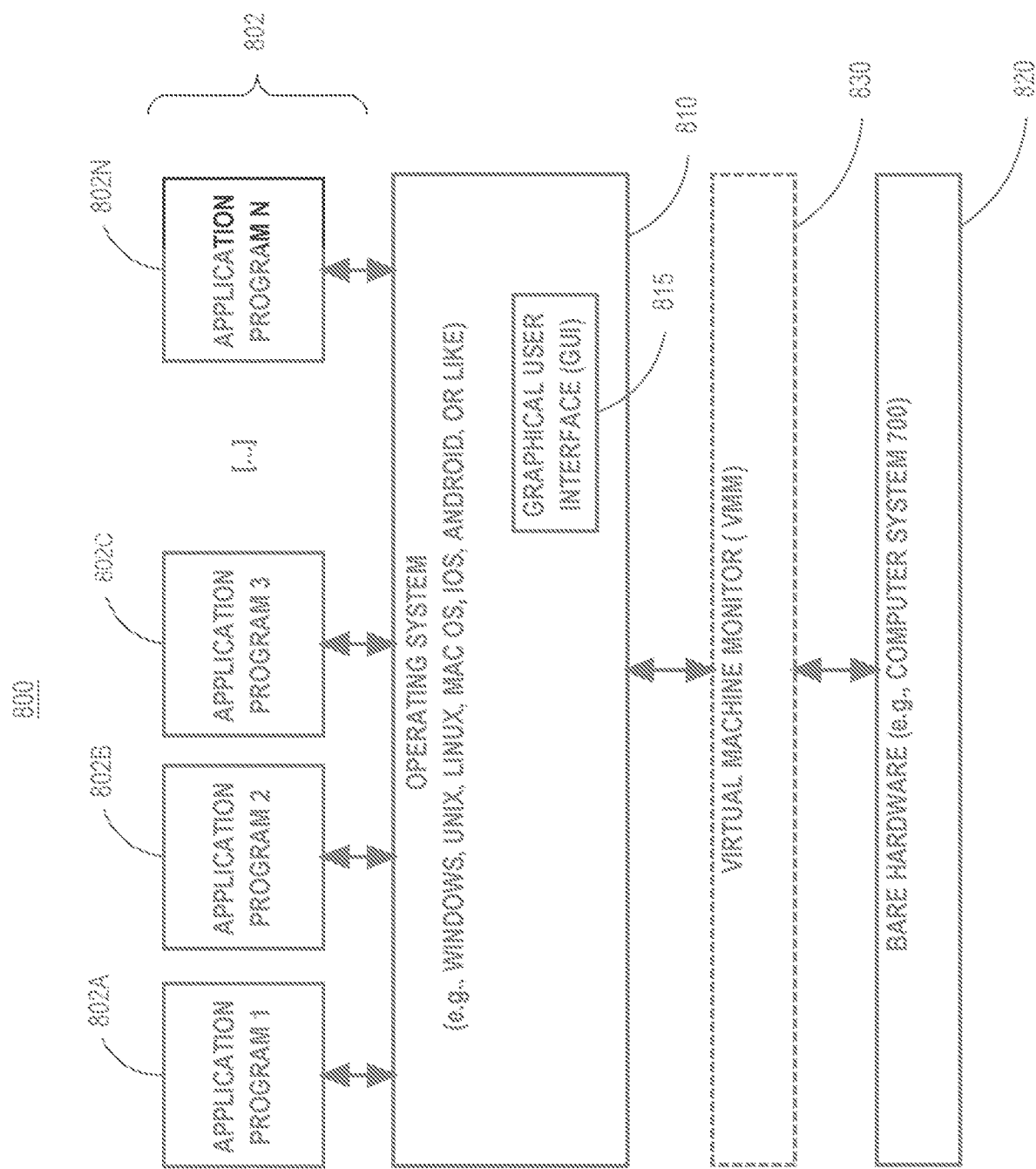
FIG. 8 is a block diagram that illustrates an example software system that may be employed for controlling the operation of a computing system.

FIG. 8 is a block diagram of a basic software system 800 that may be employed for controlling the operation of computer system 700 of FIG. 7. Software system 800 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 800 is provided for directing the operation of computer system 700. Software system 800, which may be stored in system memory (RAM) 706 and on fixed storage (e.g., hard disk or flash memory) 710, includes a kernel or operating system (OS) 810.

The OS 810 manages low-level aspects of computer operation, including managing execution of processes, memory allocation, file input and output (I/O), and device I/O. One or more application programs, represented as 802A, 802B, 802C . . . 802N, may be "loaded" (e.g., transferred from fixed storage 710 into memory 706) for execution by the system 800. The applications or other software intended for use on computer system 700 may also be stored as a set of downloadable computer-executable instructions, for example, for downloading and installation from an Internet location (e.g., a Web server, an app store, or other online service).

Software system 800 includes a graphical user interface (GUI) 815, for receiving user commands and data in a graphical (e.g., "point-and-click" or "touch gesture") fashion. These inputs, in turn, may be acted upon by the system 800 in accordance with instructions from operating system 810 and/or application(s) 802. The GUI 815 also serves to display the results of operation from the OS 810 and application(s) 802, whereupon the user may supply additional inputs or terminate the session (e.g., log off).

OS 810 can execute directly on the bare hardware 820 (e.g., processor(s) 704) of computer system 700. Alternatively, a hypervisor or virtual machine monitor (VMM) 830 may be interposed between the bare hardware 820 and the OS 810. In this configuration, VMM 830 acts as a software "cushion" or virtualization layer between the OS 810 and the bare hardware 820 of the computer system 700.

VMM 830 instantiates and runs one or more virtual machine instances ("guest machines"). Each guest machine comprises a "guest" operating system, such as OS 810, and one or more applications, such as application(s) 802, designed to execute on the guest operating system. The VMM 830 presents the guest operating systems with a virtual operating platform and manages the execution of the guest operating systems.

In some instances, the VMM 830 may allow a guest operating system to run as if it is running on the bare hardware 820 of computer system 700 directly. In these instances, the same version of the guest operating system configured to execute on the bare hardware 820 directly may also execute on VMM 830 without modification or reconfiguration. In other words, VMM 830 may provide full hardware and CPU virtualization to a guest operating system in some instances.

In other instances, a guest operating system may be specially designed or configured to execute on VMM 830 for efficiency. In these instances, the guest operating system is "aware" that it executes on a virtual machine monitor. In other words, VMM 830 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Multiple threads may run within a process. Each thread also comprises an allotment of hardware processing time but share access to the memory allotted to the process. The memory is used to store content of processors between the allotments when the thread is not running. The term thread may also be used to refer to a computer system process in multiple threads are not running.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   maintaining a set of data blocks in one or more extents in a non-volatile random-access memory (NVRAM) of a computing device;
   allocating a plurality of data buffers in a dynamic random-access memory (DRAM);
   allocating a plurality of buffer headers in said DRAM of the computing device, each buffer header of said buffer headers being:
      configurable to store a reference to a data buffer of said plurality of data buffers that stores a DRAM-copy of one or more data blocks of said set of data blocks, and
      configurable to store a reference to NVRAM of one or more data blocks of said set of data blocks;
   determining whether an access request to access one or more first data blocks in a first extent of the one or more extents is a read request, said access request being made by a first process executing on the computing device; and
   when said access request is a read request, granting the first process direct read access of the one or more first data blocks in the NVRAM by at least:
      storing, in a first buffer header of said plurality of buffer headers, a reference to the one or more first data blocks in the first extent in the NVRAM,
      associating the first buffer header with the first process, and
      the first process using the first buffer header to directly access the one or more first data blocks in the NVRAM; and
   when said access request is not a read request, granting the first process write access by at least:
      generating a first DRAM-copy of the one or more first data blocks in a first data buffer of said plurality of data buffers,
      storing, in the first buffer header, a reference to the first DRAM-copy of the one or more first data blocks,
      associating the first buffer header with the first process, and
      the first process using the first buffer header to access the one or more first data blocks in said first data buffer.

2. The method of claim 1, wherein the set of data blocks corresponds to a file in a persistent file storage system implemented in the NVRAM of the computing device.

3. The method of claim 1, further comprising:
   in response to a write request by a second process executing on the computing device to access one or more second data blocks in a second extent of the one or more extents, granting the second process write access by at least:
      generating a DRAM-copy of the one or more second data blocks in the DRAM,
      storing, in a second buffer header of said plurality of buffer headers, a reference to the DRAM-copy of the one or more second data blocks,
      associating the second buffer header with the second process, and the second process using the second buffer header to access the one or more second data blocks in the DRAM.

4. The method of claim 3, wherein the set of data blocks corresponds to a database stored persistently in the NVRAM, wherein the first process and the second process are database server processes, the method further comprising:
executing, by the second process, one or more update operations of a database transaction by modifying the DRAM-copy of the one or more second data blocks; and
after the database transaction is complete, committing the database transaction.

5. The method of claim 1, further comprising, in response to granting the first process direct read access to the one or more first data blocks, incrementing a first reference count for the one or more first data blocks that indicates a number of processes with direct read access to the one or more first data blocks.

6. The method of claim 5, further comprising modifying a particular data block of the set of data blocks by:
checking a reference count for the particular data block that indicates a number of processes with direct read access to the particular data block; and
updating the particular data block in the NVRAM only after determining that the reference count for the particular data block is zero.

7. The method of claim 1, further comprising, in response to a read request by a third process executing on a remote computing device to access one or more third data blocks belonging to a third extent of the one or more extents in the NVRAM of the computing device, granting the third process read access of the one or more third data blocks by at least:
transmitting the one or more third data blocks to the remote computing device;
generating, by the remote computing device, a DRAM-copy of the one or more third data blocks in the DRAM of the remote computing device;
storing, in a particular buffer header of a plurality of buffer headers in the DRAM at the remote computing device, a reference to the DRAM-copy of the one or more third data blocks at the remote computing device; and
associating the particular buffer header with the third process.

8. The method of claim 1, wherein the set of data blocks corresponds to a file in a distributed file system implemented in NVRAMs of a plurality of computing devices of a distributed computing system that includes the computing device.

9. The method of claim 8, further comprising executing a distributed database system on the plurality of computing devices, wherein the file is a database system file.

10. The method of claim 8, further comprising redistributing at least one extent in the distributed file system, wherein redistributing includes:
selecting a particular extent of the one or more extents to move from the NVRAM of the computing device to NVRAM of a different computing device of the distributed computing system;
checking one or more reference counts for one or more data blocks of a particular extent, said one or more reference counts indicating a number of processes with direct read access to said one or more data blocks of said particular extent; and
moving the particular extent to the NVRAM of the different computing device only after determining that the reference count is zero.

11. One or more non-transitory computer-readable media storing sequence of instructions, wherein the sequences of instructions, when executed by one or more hardware processors, cause:
maintaining a set of data blocks in one or more extents in a non-volatile random-access memory (NVRAM) of a computing device;
allocating a plurality of data buffers in a dynamic random-access memory (DRAM);
allocating a plurality of buffer headers in said DRAM of the computing device, each buffer header of said buffer headers being:
configurable to store a reference to a data buffer of said plurality of data buffers that stores a DRAM-copy of one or more data blocks of said set of data blocks, and
configurable to store a reference to NVRAM of one or more data blocks of said set of data blocks;
determining whether an access request to access one or more first data blocks in a first extent of the one or more extents is a read request, said access request being made by a first process executing on the computing device; and
when said access request is a read request, granting the first process direct read access of the one or more first data blocks in the NVRAM by at least:
storing, in a first buffer header of said plurality of buffer headers, a reference to the one or more first data blocks in the first extent in the NVRAM,
associating the first buffer header with the first process, and
the first process using the first buffer header to directly access the one or more first data blocks in the NVRAM; and
when said access request is not a read request, granting the first process write access by at least:
generating a first DRAM-copy of the one or more first data blocks in a first data buffer of said plurality of data buffers,
storing, in the first buffer header, a reference to the first DRAM-copy of the one or more first data blocks,
associating the first buffer header with the first process, and
the first process using the first buffer header to access the one or more first data blocks in said first data buffer.

12. The one or more non-transitory computer-readable media of claim 11, wherein the set of data blocks corresponds to a file in a persistent file storage system implemented in the NVRAM of the computing device.

13. The one or more non-transitory computer-readable media of claim 11, wherein the sequences of instructions include instructions that, when executed by one or more hardware processors, cause:
in response to a write request by a second process executing on the computing device to access one or more second data blocks in a second extent of the one or more extents, granting the second process write access by at least:
generating a DRAM-copy of the one or more second data blocks in the DRAM,
storing, in a second buffer header of said plurality of buffer headers, a reference to the DRAM-copy of the one or more second data blocks, associating the second buffer header with the second process, and the second process using the second buffer header to access the one or more second data blocks in the DRAM.

14. The one or more non-transitory computer-readable media of claim 13, wherein the set of data blocks corresponds to a database stored persistently in the NVRAM;

wherein the first process and the second process are database server processes;

wherein the sequences of instructions include instructions that, when executed by one or more hardware processors, cause:

executing, by the second process, one or more update operations of a database transaction by modifying the DRAM-copy of the one or more second data blocks; and after the database transaction is complete, committing the database transaction.

15. The one or more non-transitory computer-readable media of claim 11, wherein the sequences of instructions include instructions that, when executed by one or more hardware processors, cause, in response to granting the first process direct read access to the one or more first data blocks, incrementing a first reference count for the one or more first data blocks that indicates a number of processes with direct read access to the one or more first data blocks.

16. The one or more non-transitory computer-readable media of claim 15, wherein the sequences of instructions include instructions that, when executed by one or more hardware processors, cause modifying a particular extent of the one or more extents by:

checking a reference count for the particular data block that indicates a number of processes with direct read access to the particular data block; and updating the particular data block in the NVRAM only after determining that the reference count for the particular data block is zero.

17. The one or more non-transitory computer-readable media of claim 11, wherein the instructions include instructions that, when executed by one or more hardware processors, cause, in response to a read request by a third process executing on a remote computing device to access one or more third data blocks belonging to a third extent of the one or more extents in the NVRAM of the computing device, granting the third process read access of the one or more third data blocks by at least:

transmitting the one or more third data blocks to the remote computing device;

generating, by the remote computing device, a DRAM-copy of the one or more third data blocks in the DRAM of the remote computing device;

storing, in a particular buffer header of a plurality of buffer headers in the DRAM at the remote computing device, a reference to the DRAM-copy of the one or more third data blocks at the remote computing device; and associating the particular buffer header with the third process.

18. The one or more non-transitory computer-readable media of claim 11, wherein the set of data corresponds to a file in a distributed file system implemented in NVRAMs of a plurality of computing devices of a distributed computing system that includes the computing device.

19. The one or more non-transitory computer-readable media of claim 18, wherein the sequences of instructions include instructions that, when executed by one or more hardware processors, cause executing a distributed database system on the plurality of computing devices;

wherein the file is a database system file.

20. The one or more non-transitory computer-readable media of claim 18, wherein the sequences of instructions include instructions that, when executed by one or more hardware processors, cause redistributing at least one extent in the distributed file system, wherein redistributing includes:

selecting a particular extent of the one or more extents to move from the NVRAM of the computing device to NVRAM of a different computing device of the distributed computing system;

checking one or more reference counts for one or more data blocks of a particular extent, said one or more reference counts indicating a number of processes with direct read access to said one or more data blocks of said particular extent; and moving the particular extent to the NVRAM of the different computing device only after determining that the reference count is zero.

* * * * *

UNITED STATES PATENT AND TRADEMARK OFFICE
CERTIFICATE OF CORRECTION

PATENT NO. : 10,719,446 B2  
APPLICATION NO. : 15/693273  
DATED : July 21, 2020  
INVENTOR(S) : Loaiza et al.

Page 1 of 1

It is certified that error appears in the above-identified patent and that said Letters Patent is hereby corrected as shown below:

On the Title Page

On page 4, Column 1, under Other Publications, Line 15, delete ""Fundatmentals" and insert -- "Fundamentals --, therefor.

On page 4, Column 2, under Other Publications, Line 41, delete "Hasing"," and insert -- Hashing", --, therefor.

On page 4, Column 2, under Other Publications, Line 56, delete "ACM SIGVOMM," and insert -- ACM SIGCOMM, --, therefor.

On page 5, Column 1, under Other Publications, Line 2, delete "tobByte-" and insert -- to Byte- --, therefor.

In the Drawings

On sheet 4 of 8, in FIG. 4, under Reference Numeral 402, Line 1, delete "INNVRAM" and insert -- IN NVRAM --, therefor.

In the Specification

In Column 11, Line 53, delete "N.H," and insert -- N.H1 --, therefor.

Signed and Sealed this  
Thirty-first Day of August, 2021

Drew Hirshfeld  
*Performing the Functions and Duties of the*  
*Under Secretary of Commerce for Intellectual Property and*  
*Director of the United States Patent and Trademark Office*